United States Patent
Zarokian et al.

(10) Patent No.: US 12,242,521 B2
(45) Date of Patent: Mar. 4, 2025

(54) DYNAMIC INTERACTIVE GRAPHING FOR ATTRIBUTES

(71) Applicant: Third Bridge (US) Inc., New York, NY (US)

(72) Inventors: Bruno Zarokian, Zürich (CH); Ambuj Agrawal, London (GB)

(73) Assignee: Third Bridge (US) Inc., New York, NY (US)

( * ) Notice: Subject to any disclaimer, the term of this patent is extended or adjusted under 35 U.S.C. 154(b) by 62 days.

(21) Appl. No.: 17/941,774

(22) Filed: Sep. 9, 2022

(65) Prior Publication Data

US 2024/0086432 A1    Mar. 14, 2024

(51) Int. Cl.
*G06F 16/22* (2019.01)
*G06F 16/31* (2019.01)
*G06N 5/01* (2023.01)

(52) U.S. Cl.
CPC ........ *G06F 16/322* (2019.01); *G06F 16/2272* (2019.01); *G06N 5/01* (2023.01)

(58) Field of Classification Search
CPC ...... G06N 5/01; G06F 16/322; G06F 16/2272
USPC .......................................................... 707/758
See application file for complete search history.

(56) References Cited

U.S. PATENT DOCUMENTS

| | | | | | |
|---|---|---|---|---|---|
| 6,035,300 | A * | 3/2000 | Cason | ................... | G06F 16/288 707/999.102 |
| 6,345,264 | B1 * | 2/2002 | Breese | ................ | G06F 16/9535 707/999.005 |
| 6,353,813 | B1 * | 3/2002 | Breese | ................ | G06F 16/9535 707/999.005 |
| 7,010,542 | B2 * | 3/2006 | Trappen | ................ | G06F 16/284 707/999.102 |
| 7,953,767 | B2 * | 5/2011 | Shaburov | .................. | G06F 8/34 707/805 |
| 8,126,937 | B2 * | 2/2012 | Shaburov | ............ | G06F 16/2428 707/805 |
| 8,166,026 | B1 * | 4/2012 | Sadler | ................... | G06F 16/951 707/732 |
| 9,251,225 | B2 * | 2/2016 | Stanfill | .................... | G06F 16/25 |
| 10,332,072 | B2 * | 6/2019 | Feely | .................... | G06Q 10/10 |
| 10,943,072 | B1 * | 3/2021 | Jaganmohan | .......... | G06N 5/041 |
| 11,138,249 | B1 * | 10/2021 | Tosik | .................. | G06F 16/3347 |
| 11,501,238 | B2 * | 11/2022 | Fletcher | ........... | G06Q 10/06393 |
| 11,526,511 | B1 * | 12/2022 | Tankersley | ............. | G06Q 10/10 |
| 11,620,338 | B1 * | 4/2023 | Bullard | ................. | G06F 16/287 707/798 |
| 11,671,312 | B2 * | 6/2023 | Puri | ........................ | H04L 43/04 709/224 |

(Continued)

*Primary Examiner* — Hanh B Thai
(74) *Attorney, Agent, or Firm* — Polsinelli PC

(57) ABSTRACT

Methods and systems are disclosed for dynamic interactive graphing of entity attributes. Data is received into a structured interface, the data defining attributes of an entity, and the structured interface defining relationships between the attributes. An interactive graph is generated of the attributes. The attributes are arranged within the interactive graph according to the relationships. The interactive graph is presented using a graphical user interface. The system receives a selection of at least one specified attribute of the attributes and rearranges the interactive graph dynamically in the graphical user interface based on the selection of the at least one specified attribute of the attributes.

20 Claims, 18 Drawing Sheets

(56) References Cited

U.S. PATENT DOCUMENTS

| | | | | |
|---|---|---|---|---|
| 11,714,843 B2* | 8/2023 | Abhyankar | G06F 16/3344 | 707/798 |
| 11,720,572 B2* | 8/2023 | Liu | G06F 16/335 | 707/771 |
| 11,755,559 B1* | 9/2023 | Tankersley | G06F 16/2358 | 707/694 |
| 11,768,893 B2* | 9/2023 | Stillwell, Jr. | G06F 16/9038 | 707/706 |
| 11,775,898 B1* | 10/2023 | Thompson | G06F 16/221 | 707/999.102 |
| 11,900,294 B2* | 2/2024 | Miller | G06N 5/01 | |
| 2004/0003132 A1* | 1/2004 | Stanley | G06F 16/20 | 719/316 |
| 2004/0113934 A1* | 6/2004 | Kleinman | G06F 16/4393 | 715/732 |
| 2005/0289166 A1* | 12/2005 | Stanley | G06F 16/20 | |
| 2006/0037019 A1* | 2/2006 | Austin | G06F 8/10 | 718/100 |
| 2006/0150092 A1* | 7/2006 | Atkins | G06T 11/60 | 715/251 |
| 2008/0098008 A1* | 4/2008 | Eid | G06Q 50/20 | |
| 2008/0109467 A1* | 5/2008 | Brookins | G06Q 10/06 | 707/999.102 |
| 2009/0083314 A1* | 3/2009 | Maim | G06F 40/194 | |
| 2009/0099994 A1* | 4/2009 | Brelage | G06N 5/025 | 706/47 |
| 2009/0282013 A1* | 11/2009 | Joshi | G06F 16/951 | 707/999.005 |
| 2010/0228712 A1* | 9/2010 | Wexler | G06Q 30/0256 | 707/706 |
| 2011/0055756 A1* | 3/2011 | Chen | G06F 3/0482 | 715/810 |
| 2012/0198369 A1* | 8/2012 | Sorin | G06Q 10/10 | 715/763 |
| 2013/0046799 A1* | 2/2013 | Hale | G06F 16/211 | 707/805 |
| 2013/0166600 A1* | 6/2013 | Snyder, II | G06F 16/2246 | 707/798 |
| 2013/0218640 A1* | 8/2013 | Kidder | G06Q 30/0254 | 705/7.33 |
| 2014/0032617 A1* | 1/2014 | Stanfill | G06F 16/25 | 707/809 |
| 2014/0114962 A1* | 4/2014 | Rosenburg | G06F 16/2423 | 707/723 |
| 2014/0128996 A1* | 5/2014 | Sayyarrodsari | G05B 19/41885 | 700/29 |
| 2014/0214960 A1* | 7/2014 | Allen | H04L 67/535 | 709/204 |
| 2015/0242409 A1* | 8/2015 | Frohock | G06F 16/2456 | 707/620 |
| 2016/0055202 A1* | 2/2016 | Rosenburg | G06F 16/24578 | 707/768 |
| 2016/0103559 A1* | 4/2016 | Maheshwari | G06F 3/0481 | 715/738 |
| 2017/0235436 A1* | 8/2017 | Hooton | G06F 3/04817 | 705/7.11 |
| 2018/0024901 A1* | 1/2018 | Tankersley | G06Q 10/06393 | 707/694 |
| 2018/0048673 A1* | 2/2018 | Hunt | H04L 41/22 | |
| 2020/0004746 A1* | 1/2020 | Randall | G06T 11/206 | |
| 2020/0036803 A1* | 1/2020 | Galchenko | H04L 67/535 | |
| 2020/0133472 A1* | 4/2020 | Fala | G05B 19/042 | |
| 2020/0364584 A1* | 11/2020 | Crabtree | G06N 5/02 | |
| 2022/0075515 A1* | 3/2022 | Floren | G06F 3/04847 | |
| 2022/0075793 A1* | 3/2022 | Jezewski | G06N 5/04 | |
| 2022/0236965 A1* | 7/2022 | Rahill-Marier | G06F 9/451 | |
| 2022/0342727 A1* | 10/2022 | Eedarapalli | G06F 8/36 | |
| 2022/0353157 A1* | 11/2022 | Matkowsky | G06F 3/04847 | |
| 2024/0105337 A1* | 3/2024 | Trakadis | G16B 50/00 | |

* cited by examiner

FIG. 4

| Company/Product... | Score Q% / I% / G% | All Owners ⌄ | Vertical | EMEA (7023) | In charge / Rationale | Consumer (5184) ⌄ | No graph ⌄ | Search ⌄ | Agents |
|---|---|---|---|---|---|---|---|---|---|
| Business entity | | | | | | | | | |
| International NV | 0% / 1% / 0% | | EMEA | | | | | | |
| El Corte Inglés SA | 2% 1% / 0% / 1% | | Consumer EMEA | | Not set | | | | |
| Nokian Tyres plc | 2% 0% / 2% / 0% | | Consumer EMEA | | Not set | | | | |
| Brunello Cucinelli SpA | 2% 0% / 2% / 0% | | Consumer EMEA | | Not set | | | | |
| Aleph Farms | 2% 0% / 2% / 0% | | Consumer EMEA | | Not set | | | | |
| Mosa Meat | 2% 0% / 2% / 0% | | Consumer EMEA | | Not set | | | | |
| Global Fashion Group SA | 2% 0% / 2% / 0% | | Consumer EMEA | | | | | | |
| Cazoo Ltd | 2% 1% / 1% / 0% | | Consumer EMEA | | | | | | |

El Corte Inglés SA
www.elcorteingles.es

Select owner ⌄

Rationale...

Cancel    Add Agent

DYNAMIC INTERACTIVE GRAPHING FOR ATTRIBUTES

TECHNICAL FIELD

The present disclosure pertains to visual modeling of entities and more specifically pertains to dynamic interactive graphing of entity attributes and mapping across entities based on attributes.

BACKGROUND

Researchers of large and dispersed data sets can be faced with a deluge of information that is difficult to consume and understand. Difficulties can arise from the sheer volume of data, incongruencies in data supplied by or presented through different sources, incomplete data, varying formats for presentation of the same or similar data, misrepresentations behind the meaning of the data, different interpretations of the data by various parties that may have different perspectives and goals, and lack of relevancy of portions of the data combined with difficulty in determining what data is relevant versus what data is not. With all these difficulties, data can have a lot of noise and researchers can be overwhelmed in attempting to cut through that noise. Systems and methods are needed to solve these issues.

SUMMARY OF THE DISCLOSURE

Methods and systems are disclosed for dynamic interactive graphing of entity attributes. Data is received into a structured interface, the data defining attributes of an entity, and the structured interface defining relationships between the attributes. An interactive graph is generated of the attributes. The attributes are arranged within the interactive graph according to the relationships. The interactive graph is presented using a graphical user interface. The system receives a selection of at least one specified attribute of the attributes and rearranges the interactive graph dynamically in the graphical user interface based on the selection of the at least one specified attribute of the attributes. The system resolves issues in processing large and dispersed data sets and allows for data research to be accelerated, allows for use of trustworthy and verifiable data to be extracted and used from data sources, allows for extraction of useful data, and allows for data discovery to be streamlined to yield meaningful and high quality results.

In one example, a method of dynamic interactive graphing is provided. The method includes: receiving data input into a structured interface, the data defining attributes of an organization, and the structured interface defining relationships between the attributes; generating an interactive graph of the attributes, the attributes arranged within the interactive graph according to the relationships; presenting the interactive graph using a graphical user interface; receiving a selection of at least one specified attribute of the attributes; and as a result of receiving the selection of the at least one specified attribute, dynamically rearranging the interactive graph in the graphical user interface according to the at least one specified attribute.

In another example, an apparatus for dynamic interactive graphing is provided. The apparatus includes a memory and one or more processors (e.g., implemented in circuitry) coupled to the memory. The one or more processors are configured to and can: receive data input into a structured interface of the system, the data defining attributes of an entity, and the structured interface defining relationships between the attributes; generate an interactive graph of the attributes, wherein to generate the interactive graph, the executable instructions, as a result of execution by the one or more processors, further cause the system to arrange the attributes within the interactive graph according to the relationships; cause the interactive graph to display in a graphical user interface of the system; receive a selection, made via the graphical user interface, of at least one specified attribute of the attributes in the interactive graph; and as a result of receiving the selection of the at least one specified attribute, dynamically rearrange the interactive graph in the graphical user interface according to the at least one specified attribute.

In another example, a non-transitory computer-readable medium is provided that has stored thereon instructions that, when executed by one or more processors, cause the one or more processors to: receive data input into a structured interface of the system, the data defining attributes of an entity, and the structured interface defining relationships between the attributes; generate an interactive graph of the attributes, wherein to generate the interactive graph, the executable instructions, as a result of execution by the one or more processors, further cause the system to arrange the attributes within the interactive graph according to the relationships; cause the interactive graph to display in a graphical user interface of the system; receive a selection, made via the graphical user interface, of at least one specified attribute of the attributes in the interactive graph; and as a result of receiving the selection of the at least one specified attribute, dynamically rearrange the interactive graph in the graphical user interface according to the at least one specified attribute.

In another example, an apparatus for dynamic interactive graphing is provided. The apparatus includes: means for receiving data input into a structured interface, the data defining attributes of an organization, and the structured interface defining relationships between the attributes; means for generating an interactive graph of the attributes, the attributes arranged within the interactive graph according to the relationships; presenting the interactive graph using a graphical user interface; receiving a selection of at least one specified attribute of the attributes; and means for dynamically rearranging the interactive graph in the graphical user interface according to the at least one specified attribute as a result of receiving the selection of the at least one specified attribute.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

FIG. 4 is a conceptual diagram illustrating a user interface of an Agent Workflow and Selection Tool, in accordance with some examples;

FIG. 5 is a conceptual diagram illustrating a user interface of an Entity Sourcing and Coverage Tool, in accordance with some examples;

FIG. 6 is a conceptual diagram illustrating a user interface of a Consolidation Tool, in accordance with some examples;

DETAILED DESCRIPTION

Figure 1:
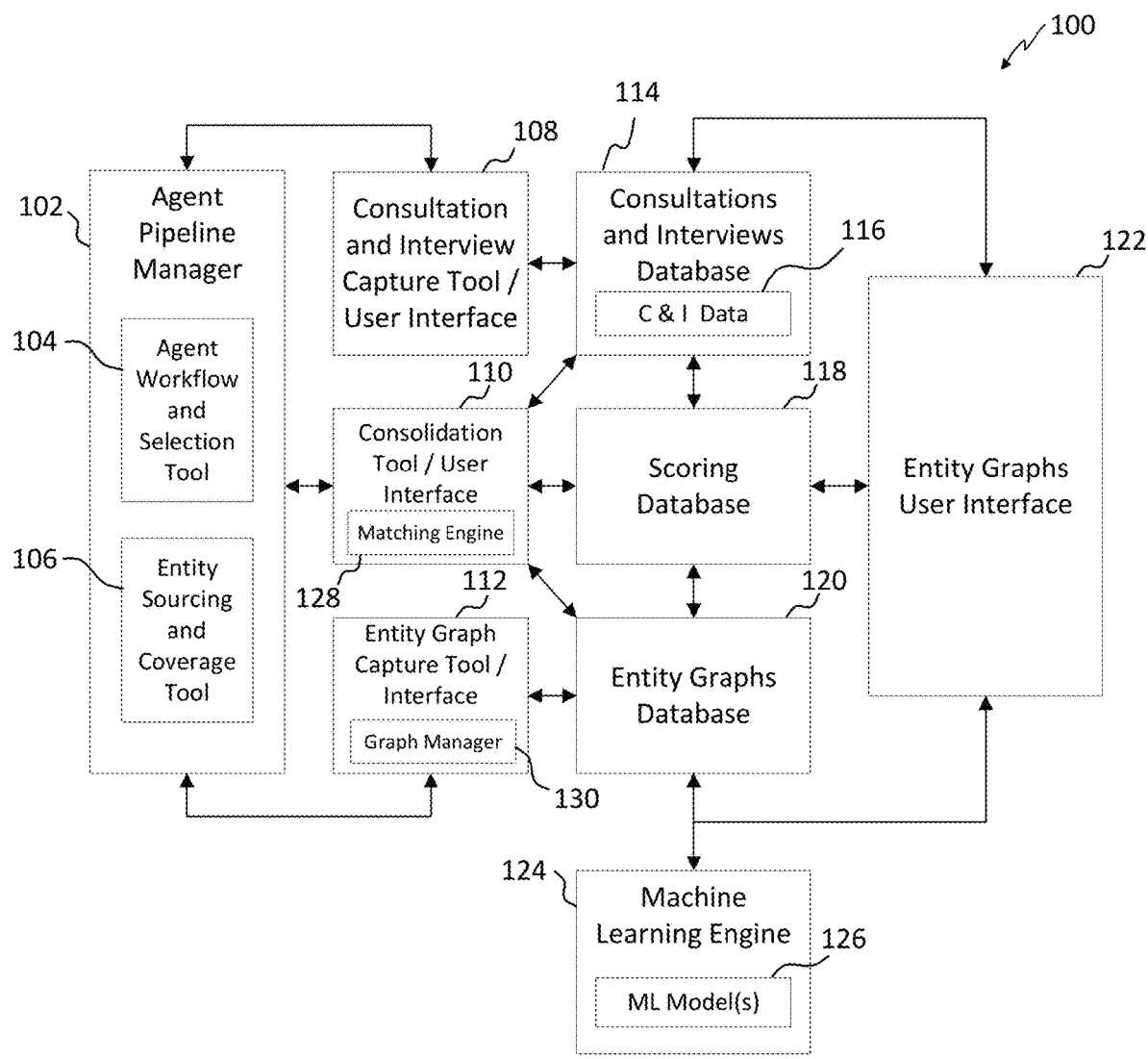
FIG. 1 is a block diagram illustrating a system for implementing certain aspects of the present technology for dynamic interactive graphing of entities, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A first aspect of the disclosure relates to entity sourcing and data graphing regarding entities. Data graphing can include mapping, charting, associating, diagramming, and the like, to represent relationships between data about entities. A knowledge capture process can be used to capture value chain maps for entities such as companies (both public and private), businesses, organizations, corporations, institutions, brand names, and the like. Data (in some embodiments, referred to as attributes) can be captured about aspects of an entity, such as the internal structure, competitors, suppliers, partners, segments, customers, distribution channels, brands, products, services, and/or other aspects of the entity. Various algorithms and automations can be run on the data captured to visualize the data in a graphical user interface in the format of a value chain map.

The value chain map for the entity can then be linked to other maps or graphs in an entity graphs database by linking an entity (e.g., a company) inside the value chain map to one or more other entities (e.g., other companies) in the entity graphs database. The process of linking the maps or graphs in this way is defined herein as consolidation. In an embodiment, the knowledge capture process can be performed using a knowledge capture tool, such as an entity graph capture tool. In another embodiment, consolidation can be performed using a consolidation tool.

In various embodiments, a graph of an entity is an easily digestible one-page visual representation of the value chain of the entity. The graph can visualize information about relationships between an entity. Relationships may be defined as perceived in a marketplace or industry for a particular entity. For example, relationships may be defined for a company and its customers, suppliers, and competitors, as analyzed by one or more agents (e.g., specialists, experts, researchers, and/or analysts) of the company and/or as based on an agent's familiarity with the company and its relationships with other entities within that value chain. The graph can be generated to include the most important attributes of the entity that can fit on the dimensions of the page, which can be based on a size of a sheet of paper on which the graph is to be printed, the size of a display on which the graph is to be displayed, or a combination thereof. The graph of the entity can be dynamically updated based on updates to the information about the entity stored in the entity graphs database. Graphs of multiple entities can be linked to each other using a unique identifier, such as a company name, and users can easily navigate from one graph to another using these links.

Visually representing a value chain of an entity in the form of one or more graphs can dramatically accelerate client research by providing a client with more comprehensive information about an entity in a single place and making related information, that is, information linked to an entity, readily available. Further, the knowledge of one or more agents about attributes of the entity, and/or related entities, can be recorded in a central repository, increasing the discoverability of their knowledge and the exposure of the agents and their knowledge to consumers of the graphs. Increasing the discoverability of agent knowledge in this way can enhance the quality of agent consultations with a company and decrease the time and effort a company might spend responding to external inquiries about its operations, organizational structure, and financial data, for example. Graphs can also improve the quality of data available for an entity because as more data is collected and the data evolves and grows in complexity, gaps in the data can be made more evident in a visual representation of a graph.

For the purpose of this disclosure, an entity can be a defined as a company, business, organization, institution, corporation, brand name, product, service, or a collection of these in an industry, or a combination thereof. An entity may be a subsidiary, segment, section, or department, or other part of a company. An entity may also be a partner of another entity. An entity may also be a conglomerate of other entities. For example, an entity can be an international corporation such as Amazon. According to at least one example illustrated herein, a user can enter an entity name in a search box of the Entity Graphs User Interface and retrieve a graph representing, describing, or encompassing that entity for display in the Entity Graphs User Interface, regardless of the type of entity represented by the graph.

A graph of an entity can provide a graphical depiction of the entity's internal structure as well as the relationship of the entity to related entities, such as other companies serving as, or having a relationship as, competitors, suppliers, and/or customers of the entity. Each of the parts of the entity's internal structure and related entities can be represented in the user interface by a separate, individual graph segment. The system can link the graph segments of these related entities to the graph of the entity.

The graph of the entity in a selectable user interface can interactively allow for a user to select or click into any of the individual graph segments, causing the system, via the link, to display a graph of the selected individual graph segment in the user interface. For instance, the graph can interactively allow a user to open a separate graph for each of the related entities by clicking each segment representing a related entity. When selected, a separate graph of a related competitor, supplier, and/or customer, for example, can be opened in a new page or tab of the user interface. Thus, in addition to the user interface indicating the competitors, customers, and suppliers of the entity, the system can provide a means to access graphs of the related entities via a graph for the entity.

In at least one example, techniques described herein can offer improvements to conventional systems for gathering and collating entity information for market consumption. For example, the various relationships graphed by the present system may not be apparent to a user performing research using conventional methods. The present system can make these relationships readily apparent to the user and can make navigating the relationships easy and fast, regardless that the relationships may not be in direct symmetry with each other. Additionally, the system can provide greater flexibility in the categorization of these relationships, providing more and different types of relationships as defined directly by the data. In contrast, conventional categorization of relationships between entities may be limited according to how researchers categorize relationships. For instance, in other systems, categorization can be dependent upon the researcher, the company, or the industry sector, and variations may cause relationships or other attributes to be missed. Other systems may also limit the nature and types of relationships that can be identified.

The disclosed systems and methods are not limited in categorizing relationships because the systems and methods can utilize far more data regarding the relationships between entities to make linkages specific to these relationships. The relationships identified and linked in the system, for example, can be to more granular levels of detail. In some examples, instead of merely linking company names, the system can link sector types and subtypes to an entity, and within those sector types and subtypes, can link other entities operating in those sectors. For example, hospice or home goods can be categorized as a customer, and under those, specific entities can be linked as operating under hospice or home goods categories. The disclosed systems and methods can thus provide the benefit of flexibility of categorization with an open data format, not relying merely on linkages between entities. Rather, linkages can be based directly on companies, customers, or suppliers, or on specific attributes of the companies, customers, or suppliers, or indirectly on industry sectors, product types, retail departments, brand names, customer types, or other attributes, and a user can see and navigate those linkages as they exist in practice.

Flexibility in the disclosed graphing functionality is provided by a data structure that stores graph information in a JSON format or XML format, by which the system can facilitate linkages between graph information about entities within the data structure. For example, an entity manager service or module of the system can create entities and assign each entity a unique identifier (ID). A unique ID can be used to link one graph to another graph. Unique IDs can be assigned by the system, sourced from agents based on identification of a specific entity or based on categorization of the data, provided by a user, or a combination thereof. For example, if data is identified or categorized under "Walmart," a unique ID can be automatically assigned to the data by the system as belonging to one or more categories under or related to "Walmart."

Unique IDs can also be reviewed and updated manually, e.g., by an agent, based on prior categorizations. In some cases, an entity may not have an assigned unique ID if it is not deemed important or relevant by the system. In some examples, level of relevancy can be determined by an agent, by a user, based on analysis using one or more machine learning models, or a combination thereof. For example, "food" may not be assigned a unique ID if it is not defined (e.g., in the database) as an entity requiring specific categorization, because it may not be considered a category important, interesting, relevant, specific, or granular enough to facilitate one or more inciteful linking relationships. However, "food" may be stored in the database without a unique ID to be used in general searching for related entity graphs. Linkages can then be created between graphs based on the assigned unique IDs, but linked graphs can still include references to entities that do not have unique IDs.

Aspects of the appearance of a box for an entity, a related entity, or an attribute in a graph, such as the thickness or weight of a borderline of the box in the graph, size of the box in the graph, font size, a color or shade of the box in the graph, and/or a pattern of the box in the graph, can indicate the importance of the entity, the relationship of the related entity to the entity, or the importance of the attribute to the entity. For example, a box with a border having a greater thickness or weight can represent a related entity or attribute that is a major contributor to the entity's total revenue, while a box with a border having a lesser thickness or weight can represent a related entity or attribute that is a more minor contributor to the entity's total revenue.

Additionally, an individual graph segment can represent one or more parts of an entity operating in one or more specific geographies. For instance, a greater borderline thickness for certain industry sectors in these geographies can represent the greater share of an entity's total revenue in the sectors for these geographies. Thus, thickness of the box lines thus can visually indicate a relative importance of an entity in comparison to the entities around it and with reference to the entity's one or more geographic locations. In some examples, the thickness of the lines of the boxes can be determined manually by an agent's inputs to the user interface regarding relative importance, for example, by identifying a major entity or important market region. In other examples, the thickness of the lines of the boxes can be determined automatically.

A second aspect of the disclosure relates to a knowledge capture process using one or more specialized tools, such as a Entity Graph Capture Tool, for classifying data and graphing information. Information about entities can be captured, categorized, and linked using the one or more specialized tools. Agents can provide input via a user interface of the one or more specialized tools to aid in building and improving the mapping between entities. Using the user interface of the one or more specialized tools, a user, such as an agent, can add entity attributes to a graph.

For example, a user can add attributes to a graph by first adding or linking another entity to the graph. The attribute may include the link to the other entity itself. The entity may take on further attributes from the other entity. Attributes may be shared between the entity and the other entity. Further, the user can add an internal structure for the entity to the graph. A user can then add one or more customers and/or distribution channels for the entity to the graph. A user can then add suppliers of the entity to the graph. A user can capture additional information as additional attributes of the entity, such as company size. Company size can include a range, for instance from very small to very large, which may include corresponding numerical amounts. The relative sizes can be defined by the agents, and/or can be predefined in the system. A user may also capture percentage of market size, or indicate how well an entity (e.g., the principal company or a supplier company) is doing in the market in terms of trends (e.g., market share trending up or down in the market). The user can then add competitors to the graph. Attributes (e.g., various graph elements and information about the graph elements) can be added to the graph in any order.

Once the data is captured by the system via a user interface, the system can automatically use the data to create a graph by implementing data transformations and data linkages. The system, via a user interface, can indicate the data transformations and data linkages according to the mapping to graphically illustrate how the data relates to each other. For example, to indicate that the supplier data for an entity, e.g., ABC Company, is trending downwards, the system, via the user interface, can provide a visual indication using a downward arrow associated with ABC Company. As discussed previously, related entities that have greater strategic significance to an entity can be indicated by thicker border boxes around those related entities, as illustrated in several examples herein, such as the user interfaces 700, 850, 900, and 1000.

Once the data is entered into the Entity Graph Capture Tool, the system can generate the visualizations of the data in a value chain map format or another mapping or graphing format. Visualization of the graph elements, according to box and font size and placement in the user interface, can be automatic so that the graphed elements fit on one page in the available display space of the interface window. For example, where an entity may have fewer elements and linkages, the boxes and font size of its graph elements may be larger, whereas for Amazon, which has many competitors, suppliers, and customers, the graph elements will appear smaller and more compressed to fit the graph into one window page for ease of visualization. A user can zoom in and increase magnification of an element to view the element closer. The graph elements may also be automatically reorganized on the page (i.e., in the user interface window) to better fit the graph contents within the user interface, for instance, based on the size and/or orientation (e.g., portrait, landscape) of the display of the user device.

A third aspect of the disclosure relates to automated data matching using a consolidation tool. The consolidation tool can link, on a one-to-one basis, entities in the created graph to unique identifiers (unique IDs) of entities in the Entity Graphs Database. Using an entity matching algorithm run on a matching engine, the system can automatically determine data matches of the graph elements to entities in the database. The data matches can then allow the system, via the consolidation tool, to make suggestions for mapping the database entities to graph elements. A user can select from the suggestions to automatically update a label in the graph according to the selected suggestion. The system can then automatically match and assign a unique ID from the database to the matched element anywhere the element appears in the graph. The assignment of unique IDs to the graph elements can allow linking one entity of one graph to another entity of the same or different graph via the unique IDs.

Information about the entities and associated attributes stored in the database can be automatically retrieved, parsed, reformatted, normalized, and/or analyzed by the system from a number of sources. The sources can include, for instance, market information on various websites, research sources such as Bloomberg, social media or social networking platforms such as Facebook, news sources, company sources, other databases, or from other sources and forms of market information to be used for entity matching. If the database does not contain matching data for a graph element, information can be manually entered according to agent knowledge, or the information can be sourced from outside of the database and the database can be subsequently updated. The matching process can be manual, automatic, or semi-automatic with manual steps to complete the matching information and matching process.

In some examples, the matching process is fully automatic. For instance, the elements of a graph (e.g., suppliers, customers and distribution, partners, competitors, etc.) can be automatically updated by the system for the graph based on other graphs that link to an element (e.g., a company) of the graph. For example, a graph for company A (with competitors B and C) that is linked to a graph for company D (with competitor A) can allow for an automatic update of Graph A to have competitors B, C, and D, and an automatic update of Graph D to have competitors A, B, and C. Each of A, B, C, and D that are matched have their unique identifiers stored in the database.

In some examples, graphs are automatically created (and thus, matching can be automatically performed) based on an Agent Workflow, in which selective questions can be asked of agents during the entity graphing process. The selective questions may limit or bound the data that can be entered, such that graph elements can be automatically matched to an entity in the database while creating a graph. Automating based on an Agent Workflow can provide one way to scale the graph development process and can increase graph creation speed.

Artificial intelligence and/or machine learning models can also be used with the automated Agent Workflow to clean up the data that is entered based on comparison to prior data that is already in the system. For instance, machine learning models can be trained by the system, and then used by the system, to resolve conflicts by correcting entered data or merging agent viewpoints, correct errors in names or labels, standardize naming or labeling conventions, and/or correct erroneous links between entities made by agents or automation.

The system, for example, can allow for display of a wealth of information for a company as large as Amazon on a single page while making the information digestible to a user and making related data further accessible by providing relationships (e.g., links) to that data on the same page. To do this, the system can use various optimizations in user interface development (such as for limited user interface size or screen size) and methods of creating and organizing graphical and textual data based on the size of a user interface. For instance, the system can selectively provide the most important attributes and/or other information about an entity in the graph, while hiding less important information about the entity from the graph.

The system can allow access to multiple pages of information from one page of a graph without needing scroll bars within the graph. The information provided by the single page can be far more comprehensive than conventionally provided, especially in a one-page format. The information can be provided at a more granular level than in conventional systems. For example, information for subsidiary companies can be included on the company page. Further, complete information about relevant and/or significant competitors, suppliers, and customers can also be included on the same page.

The system can allow a user to link from a high-level graph showing granular detail to a lower-level graph, with additional specifics about that detail. For example, the system can provide a way to link from a high-level graph of Amazon to a lower-level graph of one segment of an Amazon organization with one click. To further the example, the system can also allow the user interface to link to all Amazon entities from the one-page Amazon graph, such as to Amazon Web Services, Whole Foods, Amazon Fresh, and a myriad of other Amazon entities, competitors, customers, suppliers, and/or other attributes.

The system can provide an automated way of viewing information about a large company via easy-to-navigate linked graphs. The linked graphs can graphically represent how a complex company might be broken down into many smaller segments for research purposes, but the graphs can go further in that they can be living and breathing structures whose links and information can be updated as database updates come available. Additionally, the segments can be broken down into sub-segments, links can be provided to the sub-segments, and a user can access the information at the sub-segments by navigating links from the original (i.e., a segment of the parent) single page.

The system can implement one or more algorithms to determine a layout of a one-page graph based on the screen size available for display of the graph by the user interface. Based on the screen size, the complexity of an entity's structure, and the number, types, and/or significance of relationships (e.g., competitors, suppliers, customers, etc.), the one or more algorithms can compute box sizes and apply corresponding labels to and/or within the boxes in the graph.

The one or more algorithms can determine how to break down the boxes, into the size and number of boxes necessary to show the relationships, as well as where to place the boxes in the graph, to ensure that all the boxes fit on a single page display of the graph. As relationships are updated in the database, the one or more algorithms can reassess the relationships and update the breakdown and placement of the boxes within the available screen size. The one or more algorithms can additionally decide whether to break boxes down to have multiple sub-boxes within a box, depending on the granularity of data available from the database, the significance of the data, and the available space on the screen size.

In one example, to rearrange elements in a value chain map based on graph information, an algorithm includes a graphing function that computes constraint heuristics and optimizes the composing of the graph elements. The algorithm computes the weights of different graph elements based on their location in the graph, e.g., as organized in sections of the graph by internal structure, customers, competitors, or suppliers. The algorithm computes maximum heights of each of these sections based on the computed weights using different mathematical formulas. Using one example formula, the algorithm computes a height heuristic for a section of a graph as:

$$\text{height\_ratio} = 0.1 + 0.9 * \text{Math·sqrt(internal\_weight)} / (\text{Math·sqrt(internal\_weight)} + \text{Math·sqrt(competitors\_weight)}) * \text{constraint\_ratio}$$

Continuing the example, the algorithm composes each of the different sections and computes breaks between different elements. The algorithm uses multi-pass constraint heuristics and mathematical computations to determine the optimal graphing to arrange the graph information. In some examples, the algorithm can use different mathematical computations to fit in specific types of information, such as symbols and logographic (e.g., Chinese, Japanese, Korean, etc.) characters, in the resulting graph view.

To indicate varying significance within the suppliers, competitors, or customers, the appearance of labels within a box can be different and can have, for example, different font sizes or font characteristics, such as bold, italic, underlined, or capitalized font. Thus, if the significant information cannot fit in the graph, the information can be summarized under a bolded label, for example, and then be displayed in another linked graph.

To use the available space for a graph most effectively, the one or more algorithms can use a prioritization scheme, based on the available data, to determine what data to display in a graph. The prioritization can be automatically determined by the system based on various heuristics indicative of significance assigned to the data in the database and/or the amount of data available to display, such as revenue, profit, loss, number of people, diversity, number of other graphs that reference the data, or a combination thereof. In some examples, the prioritization can be provided manually by an agent based on the agent's knowledge that the data is of significant interest for that entity. In other examples, a combination of automated and manual prioritization can also be performed, for example, in the case that a large volume of data is considered significant, or in the case that multiple agents have different information about an entity or the sectors in which the entity operates. In other examples, a combination of prioritization methods can be used for different sectors for the same entity.

For automated prioritization, in some examples, the system uses unsupervised learning and reinforcement learning algorithms to determine client needs and to generate graphs displaying information relevant to the client needs. In one example, an unsupervised learning algorithm is used to identify patterns in the entity graphs database to generate unique graphs and display the relevant information for clients. In another example, the system uses reinforcement learning algorithms to automatically prioritize the information that should be shown to certain clients by getting continuous feedback from the clients. In other examples, the system can use a reinforcement learning algorithm to continuously improve the heuristics on the entities and relationships that should be displayed on the graph.

Additionally, the one or more algorithms can take into account the specific size and/or configuration of the platform for display of the graphs, that is, whether the user interface is hosted by a mobile device such as a smartphone, or a tablet, versus a laptop or a desktop device, for example. The one or more algorithms can resize and/or rearrange a graph for a different screen size and/or arrangement. The one or more algorithms can also resize and/or rearrange a graph for a different orientation of a display, for example, landscape or portrait orientation. Additionally, the one or more algorithms can resize and/or rearrange a graph if the user interface is reduced or increased in size on a display, including if a display is extended across multiple displays. In each case, the layout of the graph can be refreshed, resized, reoriented, and/or rearranged based on the physical appearance of a screen.

As previously discussed, the elements of a graph (e.g., suppliers, customers and distribution, partners, competitors, etc.) can be automatically updated for the graph based on other graphs that link to one or more elements of the graph, and vice versa. In such cases, the asymmetry of the linkages between various graphs can be leveraged automatically to further update the graphs, to fill in missing or incomplete information, or to enhance existing information in the graphs. These features can generate more comprehensive graph data (e.g., more linkages to competitors) and can provide investors a more holistic view of the ecosystem surrounding an entity such as a company.

Further, the one or more algorithms can assess the density of information about a certain entity and/or under a certain category for an entity and automatically determine how much information to display and in what location to display the information in the graph. The one or more algorithms can make the determination of amount of information and location simultaneously. In some examples, the one or more algorithms can determine location based on other factors and then can determine how much information to display, or, vice versa—can determine how much information to display based on other factors, such as significance, and then can determine where to display the information. In each case, the one or more algorithms can make these determinations while considering the graph as a whole. In some examples, the one or more algorithms can perform these determinations based on industry, such as aerospace, online retail, hospitality, transportation, etc., which may be specific to certain types of competitors, suppliers, and/or customers and thus certain types of information. Types and amount of information to display can also be prioritized based on factors related to each entity, such as size and/or significance.

Automatic creation of graphs additionally can allow for top-down or bottom-up creation of graphs, for example, to create one or more subsidiary graphs from a parent graph, or to create a parent graph from one or more subsidiary graphs. Likewise, an industry graph can be characterized by graphs of entities that participate in the industry, or an entity graph can be characterized by a graph of an industry in which the entity participates. As an example, all graphs of entities participating in the aerospace industry can be analyzed automatically, and an aerospace industry graph can be created by prioritizing certain segments of the industry graph based on aspects of the entity graphs, such as size, structure, and significant content. The one or more algorithms can determine the structure and characteristics of the aerospace industry as a whole based on the graphs of the participating entities, and/or the aerospace industry graph can be created based on the graphs of the major participants in the industry. The one or more algorithms can make a qualitative or quantitative determination of the entities that are to be considered the major participants in the industry, for example, as competitors, suppliers, and/or customers.

Graphically, the system can provide a user with the resulting industry graph to give the user a valuable understanding of what the industry looks like at a high level (e.g., at a summary view), with links to more granular data at lower levels within the graphing structure. The system can then indicate, based on the summary view, for example, which entities stand out from others in the industry. From this information, investment recommendations or other decisions internal to an entity can be made on a timely basis, leveraging graph information that can be regularly updated as changes are made within the industry, to the participating entity graphs, or to linkages between the participating graphs or from or to another entity outside of the industry. For example, if a major entity in an industry acquires a new subsidiary, significant changes may be made to the industry graph. In addition to indicating growth in the significance of the major entity in the industry, the industry graph may also include new participants that link to the subsidiary. This information can be very valuable to an investor or other user of the graphs.

The system can provide a real-time alert with updates to agents, specialists, analysts, experts, investors, researchers, and other users when a graph or a linkage from one graph to another has changed. For example, if a user is interested in Amazon's graph, the user can set an alert in the user interface to be notified if a relationship between Amazon and any of its related entities has changed. In some examples, a user can set specific parameters for triggering the alert, such as a change involving a specific entity or entities, such as a change in an entity's structure; a change involving a specific linkage between an entity and another entity, such as a change in the category or nature of a relationship between the entity and the other entity (e.g., a customer becomes a supplier); an addition to the entity or to a linked entity, such as an acquisition of a subsidiary; a specific type of change, such as a change in the significance of a related entity's relationship with the entity; or a change keyed on a particular database term or keyword, for example. Such an alert may cause a user to anticipate and check for graph updates or may encourage an investor to follow and/or pay closer attention to additional entities or linkages, for example.

The system may be configured to trigger general alerts on specific types of changes to graphs, such as any change to an entity's structure, or any competitor addition to a graph. Real-time alerts can provide an investor immediate awareness of any type of change that could affect his investment in the entity, for example, so that he can make better or more timely investment decisions. For another example, a real-time alert for a certain change to the entity may provide a user situational awareness that a supplier was affected in a certain way by the change. Further, a real-time alert for a change to a supplier may provide the entity itself awareness to evaluate the supplier further. Thus, a user can not only learn that an entity was affected by a change but how that entity was affected by a change, allowing timely information that can be acted upon in a timely manner.

The system can use a heuristic to weight, or prioritize, the relative importance of the entities based on various data sources. Relative importance can be based on an entity's standing in the market, using quantitative metrics such as company size, number of employees, market share, net worth, or other tangible significance in the market. Relative importance can be based on various data sources also. One data source for determining relative importance of entities can be the agents who contribute to the information about those entities in the entity graphs database. Greater weight can be given to a company, for example, based on the significance of a certain agent providing data for that company, the number and significance of the agent's contributions to the database, and the significance of the agent's employer affiliation. Contributing agents and their companies can be scored and the score(s) can contribute to a greater weight to the graphing information that they provide.

Various scores can be calculated by the system, as discussed further in this disclosure. For example, the system, via one or more algorithms, can calculate scores for one or more entities, one or more agents, one or more graphs, and one or more relationships, such as interest in an entity or the quality of past consultations about an entity, and/or other scores. Via these scores, the system provides a quantitative measure of an assessment regarding the value and/or confidence of the database content used to generate graphs. These scores can be used to assess the quality, completeness, and/or status of a graph and its information. For example, a relatively low graph score may indicate that the current information collected for a graph may not provide for a complete or accurate graph. A relatively low interest score may indicate that few or no agents are discussing an entity (e.g., there is lower interest in the entity), or that there are few mentions of the entity in the information curated from public sources.

A relatively low consultation score may mean that there is a lower interest in the entity by investment professionals. The consultation score can be calculated based on consultations by the agents in the past n years. For example, the consultation score can be computed by aggregating the number of agent consultations in the past n years for agents who have previously been employed by or represented the entity of interest, as determined from historical employment data or other relational data. Thus, a relatively low consultation score may mean that entity information is incomplete, prompting additional consultations to be scheduled with an agent should interest in the entity increase.

A second data source for determining relative importance of entities in the entity graphs database can be information networks. The system includes at least one information network by which knowledge is collected, managed, and shared. The information network(s) can include information from agent consultations, such as transcripts or synopses, or other consultation records. Other content of the information network(s) may include curated and non-curated information about entities, such as blog postings, chats and discussions, questions and answers (Q&A), frequently asked questions (FAQ), news postings, discussion and presentation transcripts, research reports, special reports, alerts, key insights, podcasts, quarterly trend reports, etc.

Content from the information network(s) can be used by the system to prioritize an entity graph based on a level of popularity, for example, based on the number of information network participants discussing the entity. Relative importance can also be based on the number of times an entity appears in research, or the percentage of research that is dedicated to that entity. Mentions of entities in the market, such as the number of times an entity appears in existing graphs, can increase the relative importance of an entity. For example, if Airbus is mentioned in one hundred graphs (e.g., as a main competitor, a main customer, or a main supplier), then Airbus may be considered an important company and given a greater weight.

The heuristic can be used by the system to automatically determine the layout of graphs for certain entities, for example, to determine the thickness of the border around a box representing an entity. For example, if an entity, e.g., UTC Aerospace Systems, is mentioned in fifty graphs as a competitor, supplier, or customer, the heuristic weight, or importance, of UTC Aerospace Systems as an entity could be relatively large compared to other entities in a graph. Thus, if a graph is automatically generated for UTC Aerospace Systems using the determined heuristic, the size of UTC Aerospace Systems' box and thickness of its border would be relatively large in its generated graph, or UTC Aerospace Systems could be included in an industry graph with a relatively large box and thick border, compared to other boxes and borders in the industry graph, to distinguish the company as a major player in an industry.

A fourth aspect of the disclosure relates to streamlining, automating, and scaling data capture. The system disclosed herein can be used to scale up the entity graph capture process to create a graph for every company, organization, or other entity in the world. The ability to scale up the system to this degree can be provided at least in part by the ability of the system to use information from agent profiles and/or automated systems to ensure that information about entities is captured, maintained, and updated in the entity graphs database. For example, an agent may represent a company to investors and may create a profile as a trusted expert regarding the company information. The agent may then be included in an Agent Pipeline, from which consultations can be scheduled with investors wanting to learn more about the company. The agent would be responsible for providing initial data of the company for the entity graphs database. The information can be collected via the Entity Graph Capture Tool, which includes a specific user interface that collects the agent's knowledge on the value chain of the company.

The information can be collected and collated into the entity graphs database, which then can be used to create a graph for each company for which a threshold amount of information exists in the entity graphs database. The collection and collation process can include specific data checks and categorizations to ensure consistency in the data structure. For example, agent(s) can participate in an additional profiling session involving specific questions that could be asked of each agent based on an agent's expected knowledge and experience and/or based on the information about an entity already collected. The information can be entered into a form of the user interface, for example, and it can provide means to share an agent's extended knowledge about a company, its competitors, suppliers, and customers, and related entities.

Further, the system can build the agent's profile as the agent provides more data to the system. The system can additionally score each agent by the amount and significance of data provided. For example, an agent can receive a higher score the more entities the agent identifies as a competitor in a graph. The system can then apply the Consolidation Tool to match the entered data to existing contents in the database. The system can automatically link the entered data as per the methods described in this specification. The system can further clean the entered data, for example, to deconflict conflicting information, such as by merging, clarifying, or modifying the information based on existing contents of the database as well as by applying, by the one or more algorithms, data checks and additional rules. The system can perform these steps in any order and reperform the steps as data are entered, as otherwise needed, or as requested by a user.

After data are entered, matched, checked, and, if necessary, cleaned, the system can then create a graph, based on the entered data, if the system identifies a threshold amount and types of data available to generate a graph. Using the Entity Graph Capture Tool, a graph may be created based on only a few pieces of information entered, as the data becomes available, rather than waiting until the end of an agent session, for example, and in conjunction with existing data from the entity graphs database (e.g., data in existing graphs). Created graphs can be rebuilt and/or refreshed with changes as data is entered, either automatically or manually. In some examples, using the Agent Workflow, various questions can be asked of the agents to focus data entry on specific topics and relationships. Agents can further update this information based on the agents' knowledge about different entities and industries. Graphs can become more granular and comprehensive, and the links between them can become more complete and informative as the knowledge capture process proceeds.

As described herein, artificial intelligence, machine learning, and the like can be used to dynamically make determinations and recommendations for data improvements, adding intelligence and context-awareness to an otherwise one-size-fits-all scheme for providing dynamic interactive graphing of entity attributes and/or additional or alternative services involved in entity mapping, as described herein. In some implementations, the distributed system is capable of applying the intelligence derived from existing system data to new system data, and from an existing user base to a new user, thereby making the onboarding experience for the new user personalized and frictionless when compared to traditional onboarding methods. Thus, techniques described herein improve existing technological processes.

Various graphical user interfaces (GUIs) are disclosed to facilitate the techniques described herein. Some of the techniques described herein are directed to user interface features presented via GUIs to improve interaction between system users (e.g., agents, analysts, experts, specialists, and researchers) and their devices operating the system software. Furthermore, such features may be changed dynamically based on the profiles of the users interacting with the GUIs. As such, techniques described herein are also directed to improvements to computing systems.

Various aspects of the application will be described with respect to the figures.

Figure 4:
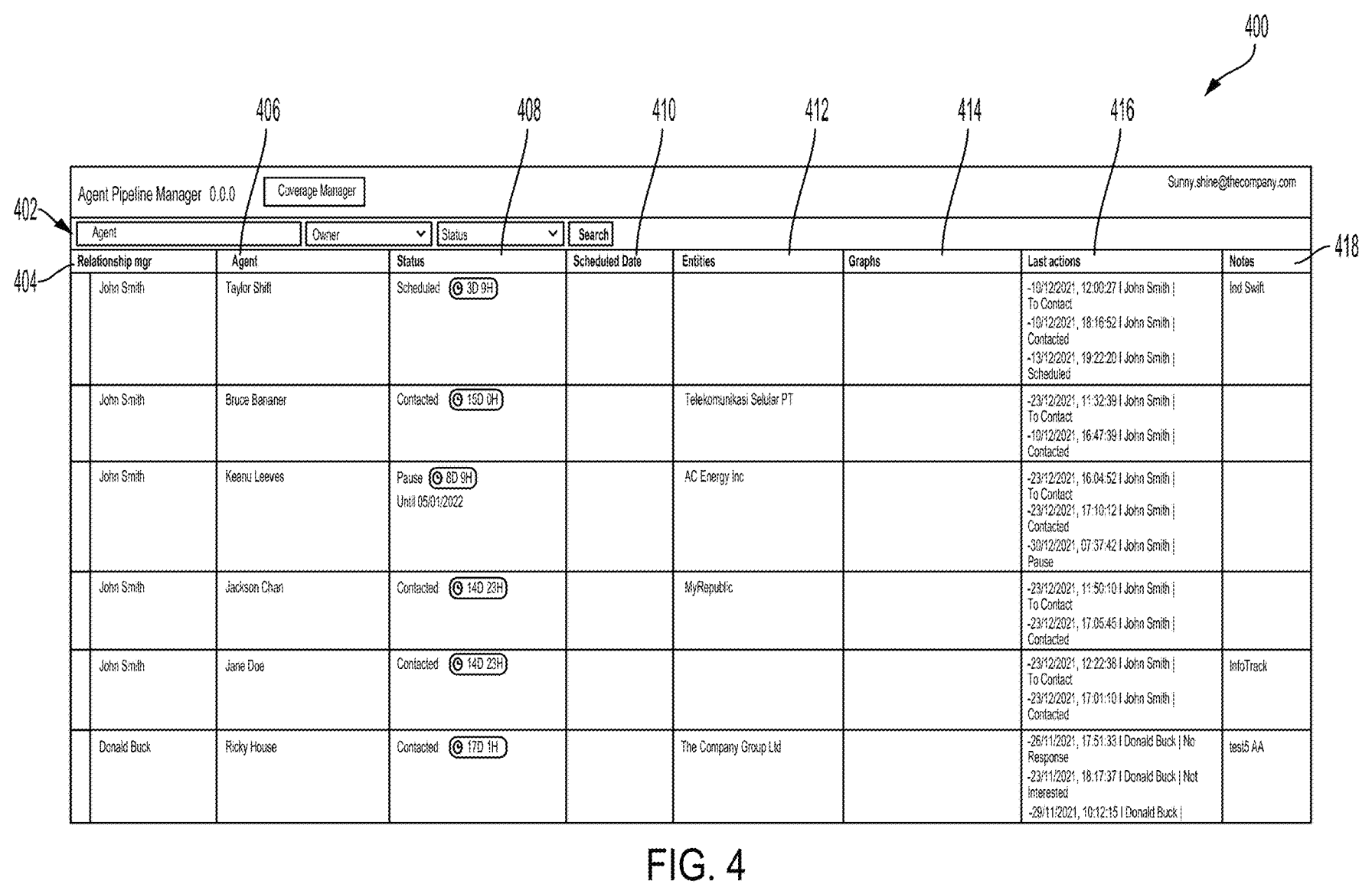

FIG. 1 is a block diagram illustrating a system 100 for dynamic interactive graphing of entities, according to some examples. In some examples, system 100 includes Agent Pipeline Manager 102. Agent Pipeline Manager 102 can facilitate, manage, and/or maintain an Agent Workflow via a specialized user interface (see FIG. 4) provided by Agent Workflow and Selection Tool 104. Data about agents, which can be specialists, experts, researchers, representatives of a company or industry, consultants, or market analysts, for example, can be entered and maintained via the Agent Workflow and Selection Tool 104. The user interface of the Agent Workflow and Selection Tool 104, further illustrated in FIG. 4, provides a way to capture information about each agent and his or her activities related to the capture of entity data during consultations and interviews (via Consultation and Interview Capture Tool/User Interface 108).

Using the data captured via the Agent Workflow and Selection Tool 104, the system 100 can select the best or most relevant agent(s) for providing or updating entity information for a particular entity graph. Selection of the best or most relevant agent(s) can be based on the number, quality, or age (i.e., recency) of consultations, the agent's seniority, the agent's employer, and/or other agent credentials, for example.

The data-driven selection of agents by the system 100 via the Agent Workflow and Selection Tool 104 enables higher quality graphs to be generated. Agents can play an important role in providing and validating entity information during the knowledge capture process, in which the quality, accuracy, and completeness of information provided by agents can drive the quality, completeness, and accuracy of entity graphs that are generated from the entity data.

Agent Pipeline Manager 102 of system 100 can additionally include an Entity Sourcing and Coverage Tool 106. The system 100 can use the Entity Sourcing and Coverage Tool 106 to source and prioritize entities by considering the number of times an entity appears in a graph, the popularity (e.g., in terms of frequency or density of discussion) of an entity in consultations and interviews, and the number of connections (or linkages) to other entities, for example. Entity sourcing and prioritizing can determine the coverage list of primary entities to cover for creating and updating graphs. FIG. 5 illustrates the data included and analyzed via a Coverage Manager user interface of the Entity Sourcing and Coverage Tool 106.

System 100 can include Consultation and Interview Capture Tool/User Interface 108. Consultation and Interview Capture Tool/User Interface 108 can facilitate the collection of entity information from agents. Once an entity is selected for graphing and the best or most relevant agent(s) is/are selected for providing information about that entity, the agent(s) can enter entity data via the Consultation and Interview Capture Tool/User Interface 108. The Consultation and Interview Capture Tool/User Interface 108 can comprise one or more user interfaces for facilitating discussions about an entity, from which entity data can be mined. The Consultation and Interview Capture Tool/User Interface 108 guides data collection from agents, including type and format of information sought, and/or provides an entry point for interview inquiries and responses involving an entity. Data collected from agents in this way can then be consolidated and graphed for an entity to determine a value chain for that entity that can be visualized by the system 100.

Figure 6:
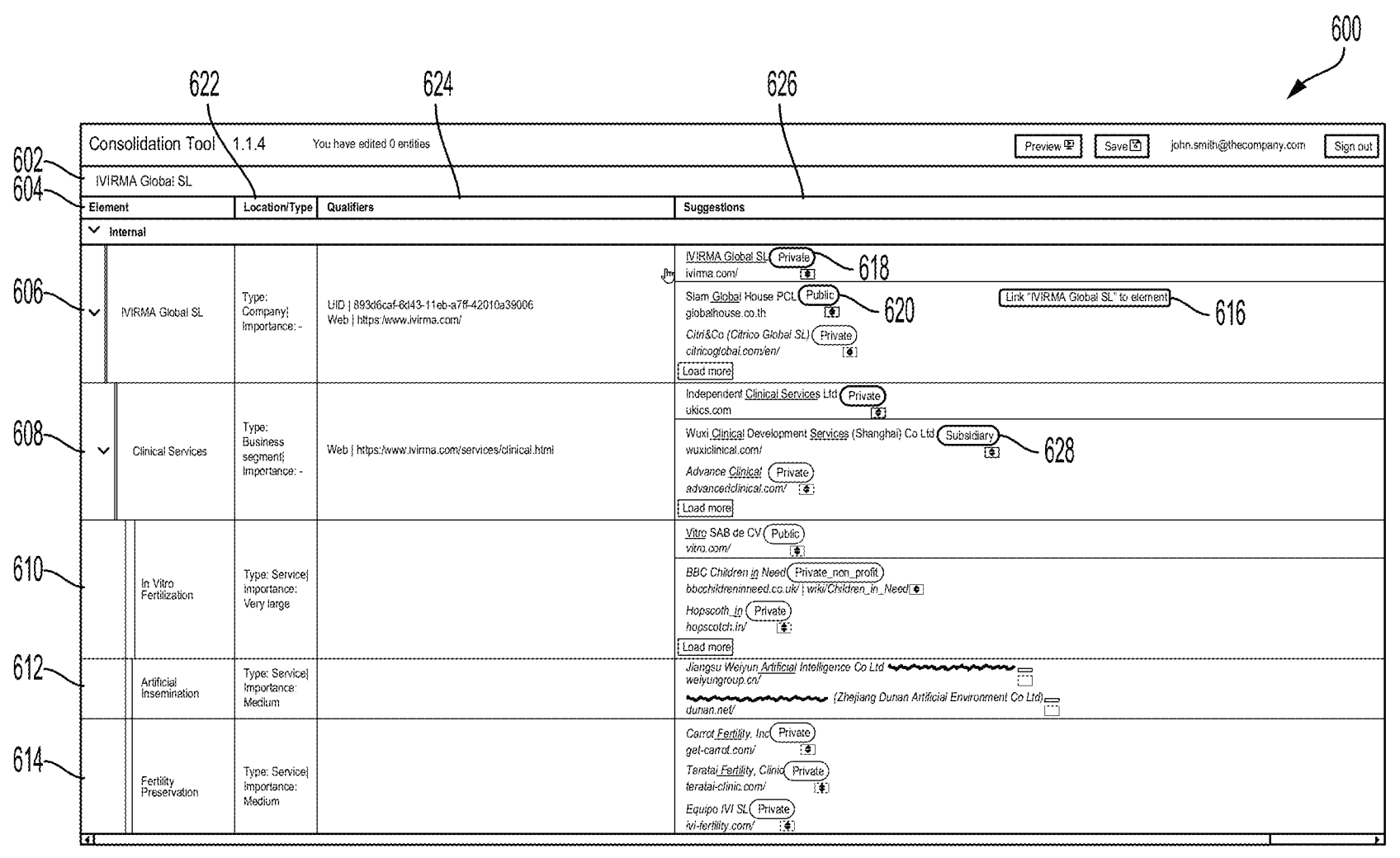

Using the Consolidation Tool/User Interface 110 of system 100, the data provided by a selected agent about an entity can be combined and/or consolidated with data provided by other agents or sources about the entity. The Consolidation Tool/User Interface 110 interfaces with Consultations and Interviews Database 114, the Scoring Database 118, and the Entity Graphs Database 120 to consolidate data provided by multiple sources about an entity. The consolidation process can involve linking entities in a graph to other entities in the Entity Graphs Database 120. The consolidation process can also help determine relative importance of entities in the Entity Graphs Database 120 based on information in the Consultations and Interviews Database 114 (e.g., number and content of consultations, number and content of interviews (Consultation and Interview (C & I) Data 116), number of participants discussing an entity), Scoring Database 118 (e.g., number of links of an entity's graph to another graph), and Entity Graphs Database 120 (e.g., number of mentions of an entity in graphs). To perform the consolidation process, the, the Consolidation Tool/User Interface 110 can implement Matching Engine 128. The Consolidation Tool/User Interface 110 can both provide information to and receive information from databases 114, 118, 120. A graphical depiction of the user interface of the Consolidation Tool is illustrated in FIG. 6.

The system 100 can also include a Entity Graph Capture Tool/User Interface 112. The Entity Graph Capture Tool/User Interface 112 may also be referred to as a knowledge capture tool and includes Graph Manager 130. Using the Entity Graph Capture Tool/User Interface 112, a graph may be created manually or automatically after the knowledge capture process from the Agent Workflow or after additional data is entered via the Entity Graph Capture Tool/User Interface 112. Via the Entity Graph Capture Tool/User Interface 112, a user can provide updated graph information or request updated graph information. Information captured using the Entity Graph Capture Tool/User Interface 112 can provide updates to the Entity Graphs Database 120. Conversely, the Entity Graphs Database 120 can provide current graph information to populate a graphical display of a graph in the Entity Graph Capture Tool/User Interface 112.

Via the Entity Graph Capture Tool/User Interface 112, graphs can be automatically generated by system 100 or manually generated by request of a user. Graphs can be rebuilt and/or refreshed with changes as data is entered, automatically, or by request of a user. Graphs can be manually or automatically generated at any point in the knowledge capture process or when the user completes the knowledge capture process.

Figure 10:
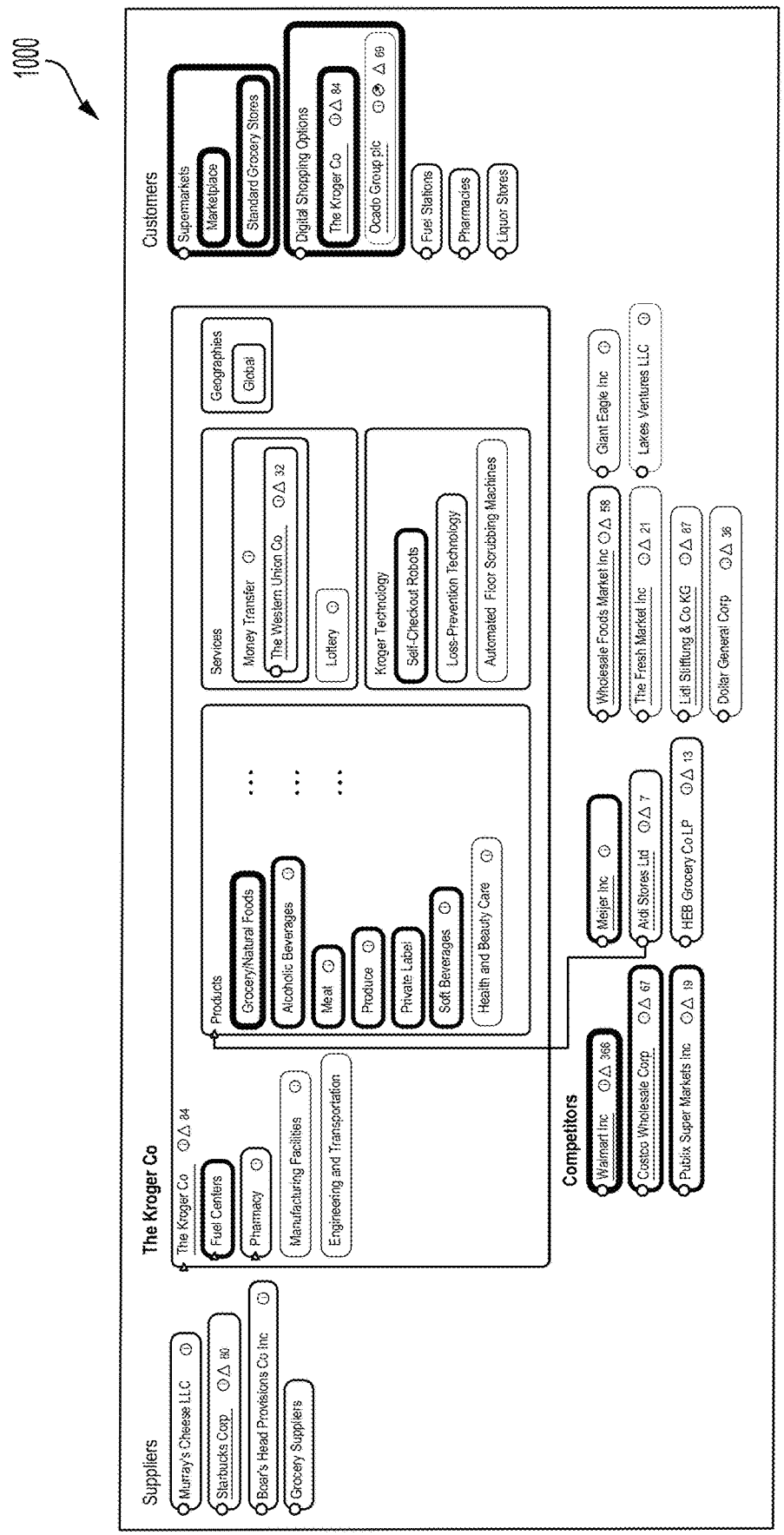
FIG. 10 is a conceptual diagram illustrating an example of a linked graph for attributes of a third entity in a user interface of an Entity Graphs Tool, in accordance with some examples.
Figure 11A:
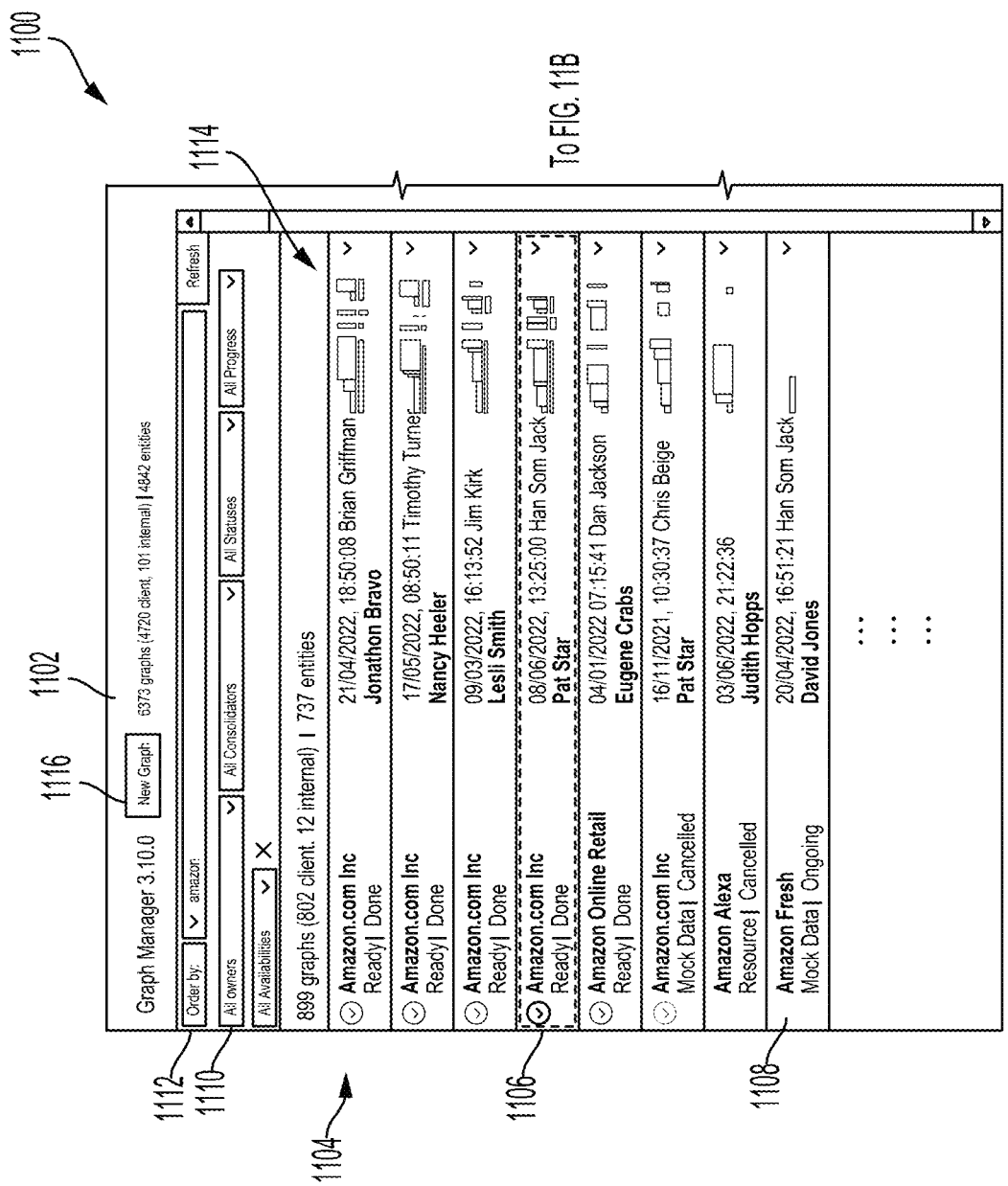
FIG. 11A is a first part of a conceptual diagram illustrating one example of a user interface of a Graph Manager for dynamic interactive graphing, in accordance with some examples.
Figure 11B:
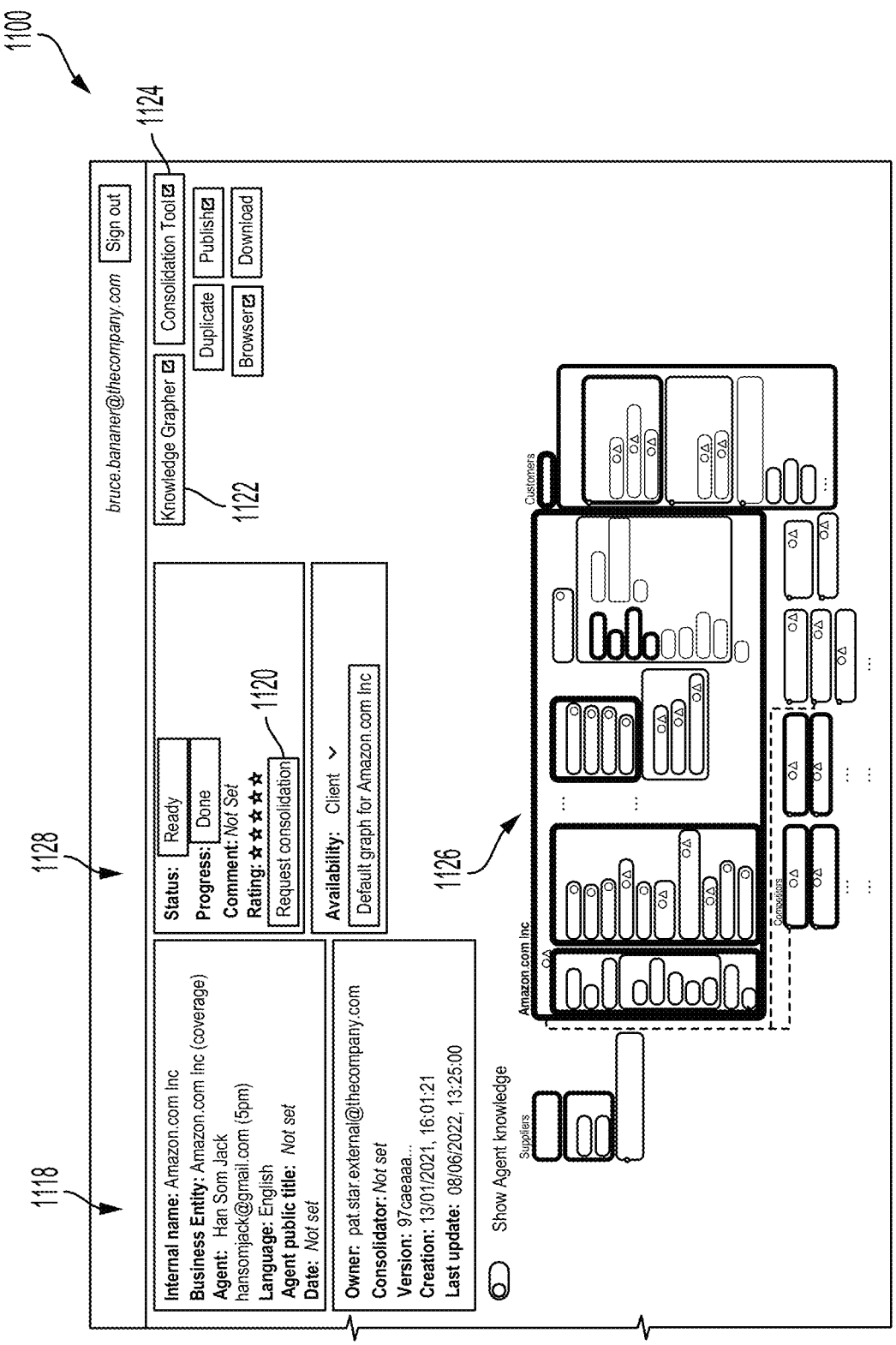
FIG. 11B is a second part of a conceptual diagram illustrating one example of a user interface of a Graph Manager for dynamic interactive graphing, in accordance with some examples.

Graphical depictions of the Entity Graph Capture Tool/User Interface 112 are illustrated in FIGS. 11A, 11B, 12, and 13. Of these figures, FIGS. 11A and 11B illustrate a Graph Manager 130, which allows a user to view, edit, and build a graph. Generated graphs can be displayed via the Entity Graphs User Interface 122. FIGS. 7, 8B, 9, and 10 illustrate the Entity Graphs User Interface 122 depicting example graphs. FIG. 8A illustrates a search function of the Entity Graphs User Interface 122 that allows a user to search for a specific graph.

As data is entered and processed into the Entity Graphs Database 120, data can be assigned a confidence code or score by the one or more algorithms. The confidence code or score can identify a confidence level in a particular relationship between an entity and an attribute, an entity and another related entity, and the like. In some examples, the confidence score is an output of one or more trained machine learning (ML) models 126. The higher the confidence score, the more the system 100 can automate the creation of graphs. For example, based on an aggregate threshold confidence score, e.g., 95%, which can be checked at various points in the Agent Workflow and knowledge capture processes, the system 100 will automatically create a graph.

In some examples, system 100 can include one or more trained machine learning (ML) models 126 trained and executed by machine learning engine 124. The trained ML model(s) 126 can run on, and/or be a part of, the server(s) 304 of cloud computing system 300. The trained ML model(s) 126 can include, for instance, one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more trained support vector machines (SVMs), one or more trained random forests (RFs), one or more encoders, one or more decoders, one or more transformers, one or more deep learning systems, or combinations thereof.

The machine learning engine 124 can train the trained ML model(s) 126 using data from the Entity Graphs Database 120 as training data. In some examples, the training data can include conflicting attributes or other conflicting data, as well as a predetermined resolution for the conflict (e.g., a predetermined selection of one of the conflicting attributes or datasets to be the correct attribute or dataset). The ML model(s) 126 can be trained using supervised learning, unsupervised learning, or a combination thereof. The ML model(s) 126 can additionally be trained using reinforcement learning. For example, the graphing functionality of the system can be automatically improved based on feedback from agents and other users using a reinforcement learning algorithm. The reinforcement learning algorithm can be used to generate an optimal learning strategy for grouping entities to generate graphs and alerts relevant to users.

The training data can include specific subsets of graph information, e.g., inputting only graph information applicable to a specific industry to the trained ML model(s) 126. In some examples, the trained ML model(s) 126 include one or more trained ML models that are personalized to a specific user (e.g., a specific specialist or expert) by being trained based on data that is specific to that specific user. In some examples, the trained ML model(s) 126 can include one or more trained ML models that are generalized for multiple users by being trained based on data specific to various users and/or simulated data for simulated users, e.g., a group of agents specific to a particular industry.

The system 100 can apply machine learning at various points in the process of dynamic interactive graphing to generate entity graphs. For example, the system 100 can apply machine learning during data arbitration, that is, to assist in merging, cleaning, and/or deconflicting data from many agents. Machine learning can be applied at the time of data entry and/or after data entry to the user interfaces described herein. Machine learning can assist in determining which conflicting pieces of information from various agents are correct. Machine learning can used in conjunction with the confidence score. A machine learning model can be applied to improve the data until a confidence score in the relationships between the data reaches or exceeds a threshold confidence score, and/or until a calculated loss from a loss function associated with the trained ML model(s) 126 falls below a loss threshold.

The system 100 can also apply machine learning during data matching. In some embodiments, when a company name is mentioned, e.g., George Martini GmbH, within the scope of an industry (e.g., aerospace industry), the system 100 will be able to determine, based on machine learning applied to the entered data about the company, that the agent is referring to one entity (e.g., George Martini GmbH) versus another entity (e.g., Lockheed Martin Co.). The system 100 can then link to the appropriate entity during the data graphing process.

A third use of machine learning in the system 100 is for connecting and clustering entities into specific groups for various uses. For example, entities can be clustered to create an industry graph based on a cluster of entities. Clustering can also be applied for triggering alerts. For example, a user can be alerted when a threshold number of specific data occurrences are found. The system 100 can create one or more knowledge graphs from the data occurrences and can base specific triggers on a knowledge graph of the one or more knowledge graphs.

In a fourth application of machine learning, all of the graph data can be fed into a machine learning algorithm to distill the information into specific categorizations of relationships. The system 100 can then provide a user the ability to search for specific information based on all of the graph data. For example, a user can specifically search for competitors of Airbus, and the system 100 can provide a list of the competitors based on learning what entities should be categorized as competitors of Airbus.

In a fifth application of machine learning, the system 100 can use machine learning to determine a specific focus of data or specific subsets of data for generating custom graphs. For example, a user may want to generate a specific industry graph of the aerospace industry, but only for a specific type of aircraft or for a specific category of aircraft, such as helicopters versus airplanes. Machine learning can enable the system 100 to automatically determine the relevance of data for specific categorizations.

In a sixth application of machine learning, the system 100 can use machine learning to assist a user in focusing a query on specific data types or categorizations. For example, a user can query for mobile phones having a specific feature, such as mobile phones with physical keyboards. Machine learning can be used to filter the graph data for information related to this particular subset of the mobile phone industry and generate a custom graph of that landscape. As yet another example, while the system 100 may have an existing industry graph of passenger cars, a user can generate a focused industry graph of only electric or hybrid cars. Thus, users can better evaluate an entity with a specific focus, and companies working in a specific area of an industry can better determine their place in it with a focused, custom industry graph.

In some examples, the machine learning engine 124 can continue to train the trained ML model(s) 126 dynamically in real-time as the trained ML model(s) 126 are used by the system 100, for instance, based on feedback on the output(s) of the trained ML model(s) 126. For instance, if the trained ML model(s) 126 are used to resolve a conflict between new data and prior data, and the system 100 receives positive feedback on the conflict resolution from a user, an agent, or another engine in the system 100, the machine learning engine 124 can use the conflict resolution as further training data, and can strengthen and/or expand on weights used for that conflict resolution. Similarly, if the trained ML model(s) 126 are used to resolve a conflict between new data and prior data, and the system 100 receives negative feedback on the conflict resolution from a user, an agent, or another engine in the system 100, the machine learning engine 124 can use the conflict resolution as further training data, and can weaken and/or remove weights used for that conflict resolution.

A person having ordinary skill in the relevant art would understand that various other uses of machine learning can be applied to the systems and methods described herein.

Figure 2:
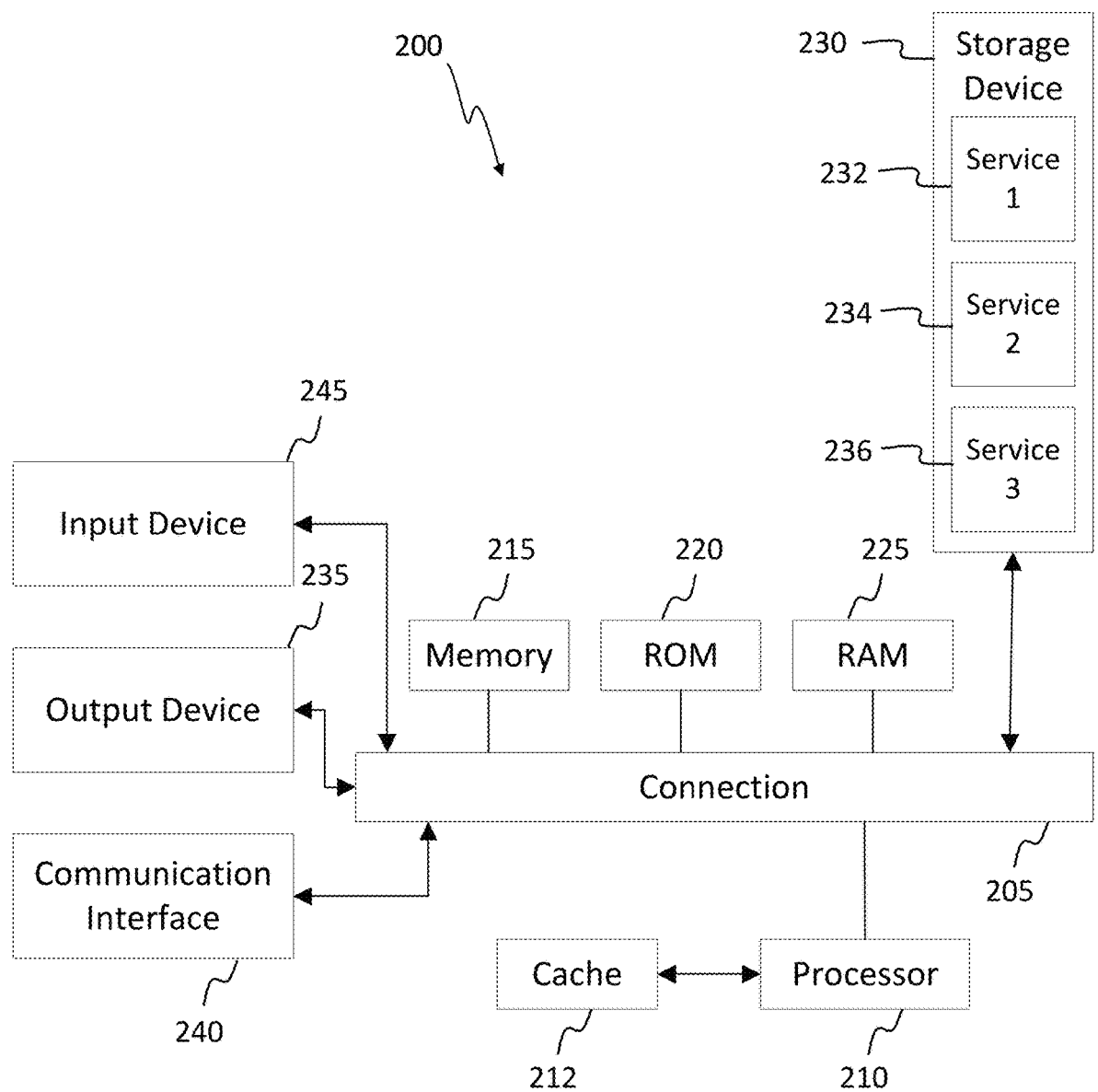
FIG. 2 is a block diagram illustrating a computer system for performing techniques described herein, in accordance with some examples.

FIG. 2 is a block diagram illustrating a computing system 200 for performing techniques described herein. Computing system 200 can be, for example, any computing device for implementing aspects of the system 100 for dynamic interactive graphing of entities, or any component thereof in which the components of the computing system 200 are in communication with each other using connection 205. Connection 205 can be a physical connection via a bus, or a direct connection into processor 210, such as in a chipset architecture. Connection 205 can also be a virtual connection, networked connection, or logical connection.

In some embodiments, computing system 200 is a distributed system in which the functions described in this disclosure can be distributed within a datacenter, multiple data centers, a peer network, etc., and alternatively, or additionally, by aspects of cloud computing system 300. In some embodiments, one or more of the described system components of computing system 200 can represent many such components, each performing some or all of the functions for which the component is described. In some embodiments, the components of computing system 200 can be physical or virtual devices.

Example computing system 200 includes at least one processing unit (CPU or processor) 210 and connection 205 that couples various system components including system memory 215, such as read-only memory (ROM) 220 and random-access memory (RAM) 225 to processor 210. Computing system 200 can include a cache of high-speed memory 212 connected directly with, in close proximity to, or integrated as part of processor 210.

Processor 210 can include any general-purpose processor and a hardware service or software service, such as services 232, 234, and 236 stored in storage device 230, configured to control processor 210, as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

For example, processor 210 can be implemented as one or more microprocessors, microcomputers, microcontrollers, digital signal processors, central processing units, state machines, logic circuitries, and/or any devices that manipulate signals based on operational instructions. In some examples, processor 210 can be one or more hardware processors and/or logic circuits of any suitable type specifically programmed or configured to execute the algorithms and processes described herein. The processor 210 can be configured to fetch and execute computer-readable processor-executable instructions stored in computer-readable media.

Storage device 230 can be a non-volatile memory device and can be a hard disk or other types of computer-readable media that can store data that are accessible by a computer, such as magnetic cassettes, flash memory cards, solid state memory devices, digital versatile disks, cartridges, random-access memories (RAMs), read-only memory (ROM), and/or some combination of these devices.

The storage device 230 can include software services, servers, services, etc., such that when the code that defines such software is executed by the processor 210, it causes the system to perform a function. In some embodiments, a hardware service that performs a particular function can include the software component stored in a computer-readable medium in connection with the necessary hardware components, such as processor 210, connection 205, output device 235, etc., to carry out the function.

Computer-readable media can be used to store and maintain any number of functional components that are executable by processor 210. In some implementations, these functional components comprise instructions or programs that are executable by the processor 210 and that, when executed, implement operational logic for performing the actions and services attributed above to computing system 200 implementing, for example, system 100.

Computer-readable media can also optionally include other functional components and data, which can include programs, drivers, etc., and the data used or generated by the functional components, such as any elements described herein as used by the system 100, the computing system 200, and the cloud computing system 300. In addition, the computer-readable media can also store data, data structures and the like, which are used by the functional components. The computer-readable media can include additional functional components, such as an operating system for controlling and managing various functions of and enabling user interactions with system 100 and for controlling and managing various functions of servers 304 and cloud servers 322, for example.

Computing system 200 can include communication interface 240, which can govern and manage user input and system output. The communication interface 240 can include one or more interfaces and hardware components for enabling communication with various other devices, such as over one or more networks. The one or more networks can include, but are not limited to, any type of network known in the art, such as a local area network or a wide area network (such as the Internet), and can include a wireless network (such as a cellular network), a cloud network (such as illustrated by cloud computing system 300 in FIG. 3), a local wireless network (such as Wi-Fi and/or close-range wireless communications, such as Bluetooth®, BLE, NFC, RFID), a wired network, or any other such network, or any combination thereof. Accordingly, networks can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

To enable user interaction, computing system 200 can include an input device 245, which can represent any number of input mechanisms, such as a microphone for speech, a touch-sensitive screen for gesture or graphical input, keyboard, mouse, motion input, speech, etc. Computing system 200 can also include output device 235, which can be one or more of a number of output mechanisms known to those of skill in the art. In some instances, multimodal systems can enable a user to provide multiple types of input/output to communicate with computing system 200.

There is no restriction on operating on any particular hardware arrangement, and therefore the basic features here may easily be substituted for improved hardware or firmware arrangements as they are developed. In some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable media expressly exclude media such as energy, carrier signals, electromagnetic waves, and signals per se.

Methods according to the examples described herein (e.g., methods 1400 and 1500) can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Figure 3:
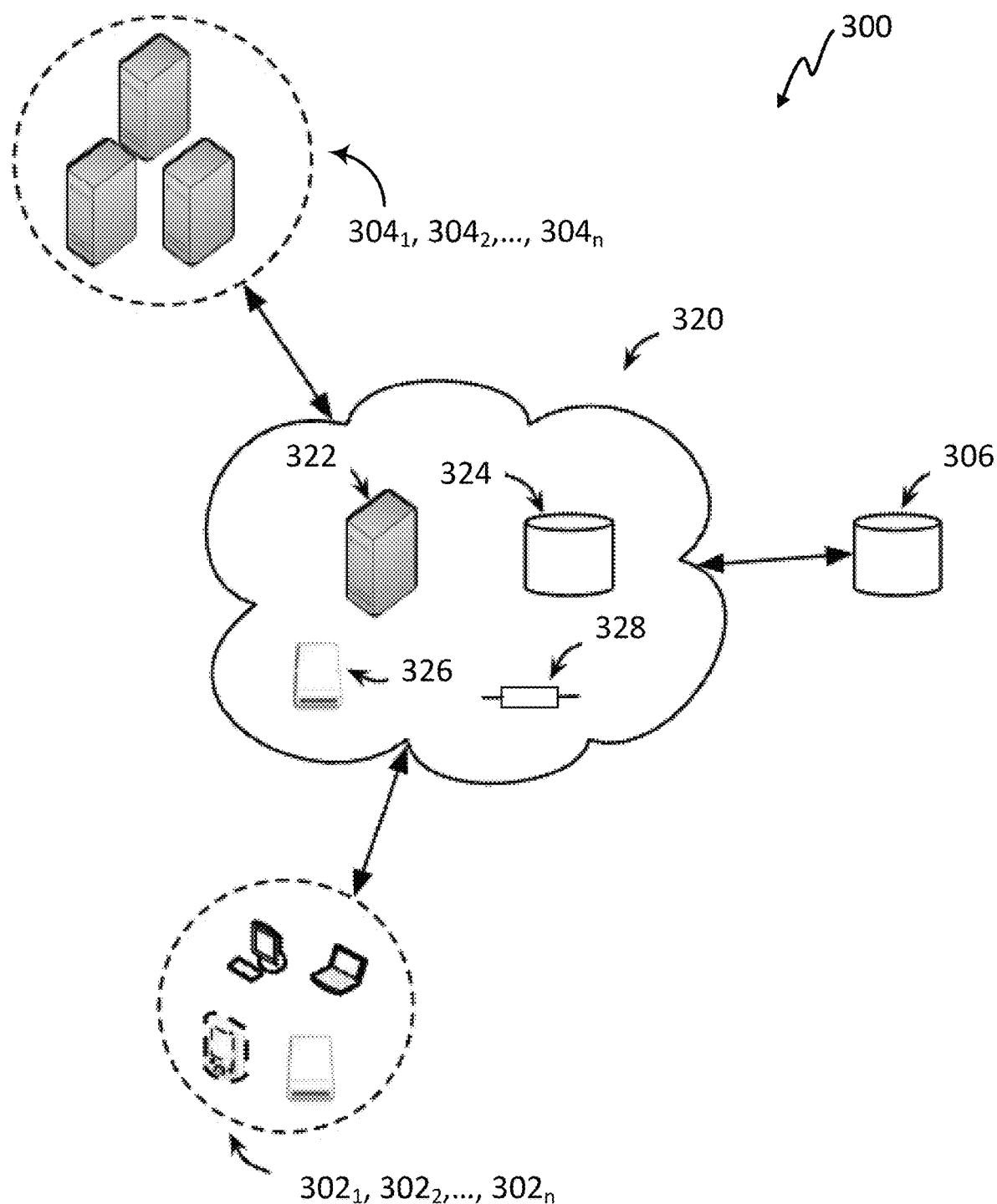
FIG. 3 is a conceptual diagram illustrating a cloud computing system for performing techniques described herein, in accordance with some examples.

FIG. 3 is a conceptual diagram illustrating a cloud computing system 300 for performing techniques described herein, in accordance with some examples. Cloud computing system 300 can implement Internet-based computing in the hosting and/or the controlling of a variety of resources by a provider of system 100, for example. Via the cloud computing system, the variety of resources can be made available by the provider to authorized users (e.g., authorized specialists, experts, entity representatives, market analysts, etc.) via the Internet. The system 100 for dynamic interactive graphing of entity attributes can be run on or in concert with cloud computing system 300, and cloud computing system 300 can connect a variety of electronic devices, each represented by computing system 200, for example.

An exemplary cloud computing system 300 is illustrated in FIG. 3, in which a variety of electronic devices can communicate via a network for purposes of exchanging content and other data. The cloud computing system can be configured for use on a wide variety of network configurations that facilitate intercommunication of electronic devices, such as computing system 200. For example, each of the components of cloud computing system 300 in FIG. 3 can be implemented in a localized or distributed fashion in a network. The information shared as inputs from authorized agents into the Agent Pipeline Manager 102, for example, and as output to an Entity Graphs User Interface 122 to authorized users, can be communicated via cloud computing system 300.

Cloud computing system 300 can be configured to include cloud computing resources 320. The cloud computing resources 320 can include a variety of hardware and/or software resources, such as cloud servers 322, cloud databases 324, cloud storage 326, cloud networks 328, cloud applications, cloud platforms, and/or any other cloud-based resources. In some cases, the cloud computing resources 320 are distributed. For example, cloud storage 326 can include multiple storage devices. In some cases, cloud computing resources 320 can be distributed across multiple cloud computing systems and/or individual network enabled computing devices. For example, cloud computing resources 320 can communicate with servers $304_1, 304_2, \ldots, 304_n$ (collectively "304"), database 306, and/or any other network enabled computing device to provide the cloud computing resources 320. Cloud servers 322 and servers 304 can include one or more processors 210, one or more computer-readable media, one or more I/O devices 235, 245, and one or more communication interfaces 240.

Furthermore, in some cases, the cloud computing resources 320 can be redundant. For example, if cloud computing resources 320 are configured to provide data backup services, multiple copies of the data can be stored such that, if one storage resource is unavailable, the data will still be available to the user. In another example, if cloud computing resources 320 are configured to provide software, the software can be available from different cloud servers so that the software can be served from the closest server.

In cloud computing system 300, a user can interact with the cloud computing resources 320 through user terminals $302_1, 302_2, \ldots, 302_n$ (collectively "302") connected to a network by direct and/or indirect communication. A user terminal $302_i$ can include, for example, computing system 200. Cloud computing resources 320 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 320 can concurrently accept connections from and interact with multiple electronic devices, such as multiple computing systems 200.

Cloud computing resources 320 can provide cloud resources through a variety of deployment models, such as public, private, community, hybrid, and/or any other cloud deployment model. In some cases, cloud computing resources 320 can support multiple deployment models. For example, cloud computing resources 320 can provide one set of resources through a public deployment model and another set of resources through a private deployment model.

In some configurations, a user terminal $302_i$ can access cloud computing resources 320 from any location where an Internet location is available. However, in other cases, cloud computing resources 320 can be configured to restrict access to certain resources such that a resource can only be accessed from certain locations. For example, if cloud computing resources 320 are configured to provide a resource using a private deployment model, then cloud computing resources 320 can restrict access to the resource, such as by requiring that a user terminal $302_i$ access the resource from behind a firewall.

Cloud computing resources 320 can provide cloud resources to user terminals 302 through a variety of service models, such as Software as a Service (SaaS), Platforms as a service (PaaS), Infrastructure as a Service (IaaS), and/or any other cloud service models. In some cases, cloud computing resources 320 can provide multiple service models to a user terminal $302_i$. For example, cloud computing resources 320 can provide both SaaS and IaaS to a user terminal $302_i$. In some cases, cloud computing resources 320 can provide different service models to different user terminals 302. For example, cloud computing resources 320 can provide SaaS to user terminal $302_1$ and PaaS to user terminal $302_2$.

In some cases, cloud computing resources 320 can maintain an account database. The account database can store profile information for registered users, such as agents. The profile information can include resource access rights, such as software the user is permitted to use, maximum storage space, etc. The profile information can also include usage information, such as computing resources consumed, data storage location, security settings, personal configuration settings, etc.

Cloud computing resources 320 can provide a variety of functionality that requires user interaction. Accordingly, a user interface, such as those described herein and illustrated in FIGS. 4, 5, 6, 7, 8A, 8B, 9, 10, 11A, 11B, 12, and 13, can be provided for communicating with cloud computing resources 320 and/or performing tasks associated with the cloud computing resources 320. Each user interface can be accessed via an end user terminal $302_i$ in communication with cloud computing resources 320. Each user interface can be configured to operate in a variety of client modes, including a fat client mode, a thin client mode, or a hybrid client mode, depending on the storage and processing capabilities of cloud computing resources 320 and/or the user terminal $302_i$. Therefore, each user interface can be implemented as a standalone application operating at the user terminal in some embodiments. In other embodiments, a web browser-based portal can be used to provide a user interface. Any other configuration to access cloud computing resources 320 can also be used in the various embodiments.

In some configurations, the cloud computing resources 320 can be used to store data such as the data stored in Consultations and Interviews Database 114, Scoring Database 118, and Entity Graphs Database 120 described above.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained.

An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally, or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The user interfaces described below in FIGS. 4, 5, 6, 7, 8A, 8B, 9, 10, 11A, 11B, 12, and 13 illustrate example graphical user interfaces, or GUIs, for various aspects of system 100 for dynamic interactive graphic of entity attributes, as described herein. In additional or alternative examples, the user interfaces described below in FIGS. 4, 5, 6, 7, 8A, 8B, 9, 10, 11A, 11B, 12, and 13 can include additional or alternative designs, functionalities, features, or the like.

FIG. 4 is a conceptual diagram illustrating a user interface 400 of the Agent Workflow and Selection Tool 104, in accordance with some examples. User interface 400 enables data about agents to be entered and maintained for the system 100. The user interface 400 provides a way to capture information about each agent and his or her activities related to the capture of entity data, for example, during consultations and interviews and/or during updates of graphs in the Entity Graph Capture Tool.

User interface 400 captures and maintains such information as Relationship Manager 404, which can be the person responsible for collecting and maintaining agent information for one or more agents (Agent 406) for a given entity, industry, or market, for example, including scheduling an interview or consultation with a given agent about an entity. Status 408 can be collected for documenting the status of interviews, for example, whether they were scheduled, had occurred, and were completed, or the amount of time before an interview is scheduled to occur, to coincide with the Scheduled Date 410. User interface 400 can collect and record the Entities 412 related to a specific Agent 406 for which an interview will be held. User interface 400 can list the related Graphs 414 for a specific Agent 406 and Entity 412 combination. Last actions 416 can be automatically recorded by system 100 as data and/or status is/are updated and entered for each entry in the user interface 400. A Relationship Manager 404 can collect notes about a specific entry in the Notes 418 column. A user can search or filter the information in the Agent Workflow user interface 400 using the search and filtering tools 402. In one example, search and filtering tools 402 allow the user to search and/or filter by agent, data owner, and interview/consultation status.

FIG. 5 is a conceptual diagram illustrating a Coverage Manager user interface 500 of the Entity Sourcing and Coverage Tool 106, in accordance with some examples. Entity Sourcing and Coverage Tool 106 can source and prioritize entities for the generation of entity graphs. Entity Sourcing and Coverage Tool 106 considers the number of connections the entity has to other entities, the popularity of the entity in the market, and the number of times an entity appears in a graph, for example, to determine which entities to source and prioritize for graph generation. User interface 500 enables the organization and display of this information for use by a Relationship Manager 404 or other user tasked with sourcing and prioritizing entities for graph generation. This information is organized in user interface 500 as a prioritized coverage list of primary entities for which to create and update graphs. User interface 500 can filter and display the coverage list by various attributes, such as company/product 522, data owner 524, region, 516, market 518, and graph status 520.

In some examples, user interface 500 prioritizes the coverage list by entity 502 based on score 504 for each entity. Score 504 for each entity can be calculated by system 100 according to the quality of an agent's consultation (Q %), the interest in or popularity of an entity, e.g., number of mentions of the entity in discussions, consultations, and interviews (e.g., in terms of percentage of all discussions in all information networks) (I %); and the number of the entity's graph appearances (in terms of percentage of all mentions of the entity in all graphs) (G %), for example. In one example, for the entity "El Corte Ingles SA" 512, the entity has a coverage score of 2% based on a quality score of 1%, an interest score of 0%, and a graph score of 1%. Among other entities, "El Corte Ingles SA" 512 is listed in priority order in the coverage list with other entities having the same coverage score of 2%. Score 504 can also be based on number of connections (or linkages) an entity has to other entities (in terms of percentage of all connections for all graphs).

A coverage list can be created for a specific market, region, or industry focus. That is, a coverage list can be created to have vertical coverage across all graphs in the entity graphs database, for example, by filtering the list of entities based on certain entity attributes. In one example, as seen in the Vertical 506 column of the coverage list in user interface 500, the coverage list is created for entities operating in the Europe, the Middle East and Africa (EMEA) region 516 and consumer market 518. That is, the coverage list for this example includes and prioritizes entities operating in Europe, the Middle East and Africa that serve customers who buy goods and services for their own use. A coverage list can also be prioritized for entities occurring in an existing graph, such as for an industry graph including many different entities. In the example shown in user interface 500, "no graph" for graph status 520 is selected.

For each entity listed in the coverage list, one or more agents can be listed in the Agents 510 column. Agents listed in the coverage list can be referenced for specific insight for an entity in the coverage list, for example, regarding the purpose, focus, and importance of a specific coverage list and the entity's role in the coverage list. Because agents' knowledge base about various entities can vary based on industry, market, and region, for example, a user can add an agent (using the Add Agent 514 function) at any time for a specific entity based on the focus of the specific coverage list and knowledge of a specific agent. The user interface 500 also includes an "In Charge/Rationale" 508 column, which may identify the entities, types of entities, regions, and/or markets for which a particular agent is providing, maintaining, and/or updating attributes and/or graphs, as well as any rationale for the association with that agent.

FIG. 6 is a conceptual diagram illustrating a user interface 600 of the Consolidation Tool 110, in accordance with some examples. After agent knowledge from the Agent Workflow is entered into system 100, further details for an entity can then be added in the Entity Graphs Database 120 automatically via a Matching Engine 128 of the Consolidation Tool 110 and/or by manually updating links via user interface 600 of the Consolidation Tool 110. The system 100 can apply the Matching Engine 128 of the Consolidation Tool 110 to match the entered entity data to existing contents in the Entity Graphs Database 120. The system 100 can automatically link the entered data and/or suggest links for the user to select and/or approve via user interface 600. The system 100 can further clean the entered data to deconflict conflicting information, such as by merging, clarifying, or modifying the information based on existing contents of the Entity Graphs Database 120, as well as by applying data checks and pre-defined data rules. The system 100 can perform these steps in any order and reperform the steps as data are entered into system 100, as otherwise needed, or as requested by a user. The order of these steps may be at least partially managed via the user interface 600.

In some examples, the Consolidation Tool 110 can link, on a one-to-one basis, entities in the created graph to unique identifiers of entities in the Entity Graphs Database 120. Using at least one entity matching algorithm run on Matching Engine 128, the system 100 can automatically determine data matches of the graph elements to entities in the Entity Graphs Database 120. The data matches can then allow the system 100, via the Consolidation Tool 110, to make suggestions for graphing the database entities to graph elements.

According to one example, as shown in FIG. 6, the user may be presented with suggestions to create links for "IVIRMA Global SL" 602. Via user interface 600, a user can link a suggested database entity in the "Suggestions" column 626 to a graph element in the "Element" column 604. For example, a user may be presented with suggestions in order of best match, where best match may be based on, for example, the highest level match in a hierarchy of graphs, the best match to shared attributes, or the best match semantically of a user-entered label to a label in the Entity Graphs Database 120. For example, in row 606 of FIG. 6, the Consolidation Tool 110 recommended mapping IVIRMA Global SL to the database element of the same name, IVIRMA Global SL, although it will be understood that the match may not only be based on the elements having the same name.

The Consolidation Tool 110 can suggest additional elements to link, as shown in rows 608, 610, 612, 614, based on other attributes. As shown in these rows, the additional suggestions may be based on matching market or industry sectors or segments (e.g., the "Clinical Services" segment, as indicated in row 608, Element column 604, and Location/Type column 622, and/or based on matching products or services (e.g., "In Vitro Fertilization" very large service, as indicated in row 610, Element column 604, and Location/Type column 622), for example.

As shown in FIG. 6, the user interface 600 of the Consolidation Tool 110 can present various pieces of information about an entity to assist the user in selecting a link. For example, user interface 600 may provide link data in the Qualifiers column 624, indicating a specific unique ID (UID) or web (https) address, as in row 606 and Qualifiers column 624. The user may see other linked or associated entities under the Suggestions column 626, such as the associated entity "Siam Global House PCL" in row 606. This may help a user to validate that the suggested element "IVIRMA Global SL" is the proper element to link to in row 606. For some examples, the user interface 600 may indicate whether a suggested entity is a private 618 or public 620 entity, or a recognized subsidiary 628 of an entity, which may also help a user validate an entity in the Entity Graphs Database 120 before linking it to the user's target graph.

In some examples, data within the "Suggestions" column for certain rows of the user interface 600 may be grayed out and not selectable if the one or more algorithms of the Consolidation Tool 110 did not find a good match between the graph entity and the database element or could not otherwise suggest a unique ID for linking the graph entity. In such a case, the graph entity may maintain its unique ID or be assigned a new unique ID.

The assignment of a unique identifier (e.g., "IVIRMA Global SL" in row 606) to a graph entity (e.g., "IVIRMA Global SL" 602) can allow linking the entity of the graph to another entity of the same or different graph via the unique identifier. A link can automatically be created with a push of a button in user interface 600. For example, when a user selects the suggested "Link 'IVIRMA Global SL' to element" button 616, the Consolidation Tool 110 can automatically update the graph element "IVIRMA Global SL" to have the unique ID of "IVIRMA Global SL" that is in the Entity Graphs Database 120. This user selection can automatically update the label in the graph according to the suggestion, and it can automatically match and assign the unique ID from the Entity Graphs Database 120 to the matched element anywhere the element appears in the graph.

The entities stored in the Entity Graphs Database 120 and presented as suggestions to be used for entity matching can be sourced from market information on websites, research sources such as Bloomberg, social media such as Facebook or LinkedIn, news sources, company sources, other databases, or from other sources and forms of market information. If the database does not contain matching data for a graph element, information can be manually entered according to agent knowledge, or the information can be sourced from outside of the database and the database can be subsequently updated. The matching process can be manual, or semi-automatic with manual steps, to complete the matching information and matching process.

Additionally, or alternatively, the matching process can be fully automatic. For instance, the elements or attributes of a graph (e.g., suppliers, customers and distribution, partners, competitors, etc.) can be automatically updated for the graph based on other graphs that link to an element or attribute (e.g., a company, market sector, etc.) of the graph. For example, a graph for company A (Graph A, with competitors B and C) that is linked to a graph for company D (Graph D, with competitor A) can allow for an automatic update of Graph A to have competitors B, C, and D, and an automatic update of Graph D to have competitors A, B, and C. Each of A, B, C, and D that are matched will have their unique identifiers stored in the Entity Graphs Database 120. In this case, the system 100 can utilize and update information stored in Scoring Database 118.

Figure 7:
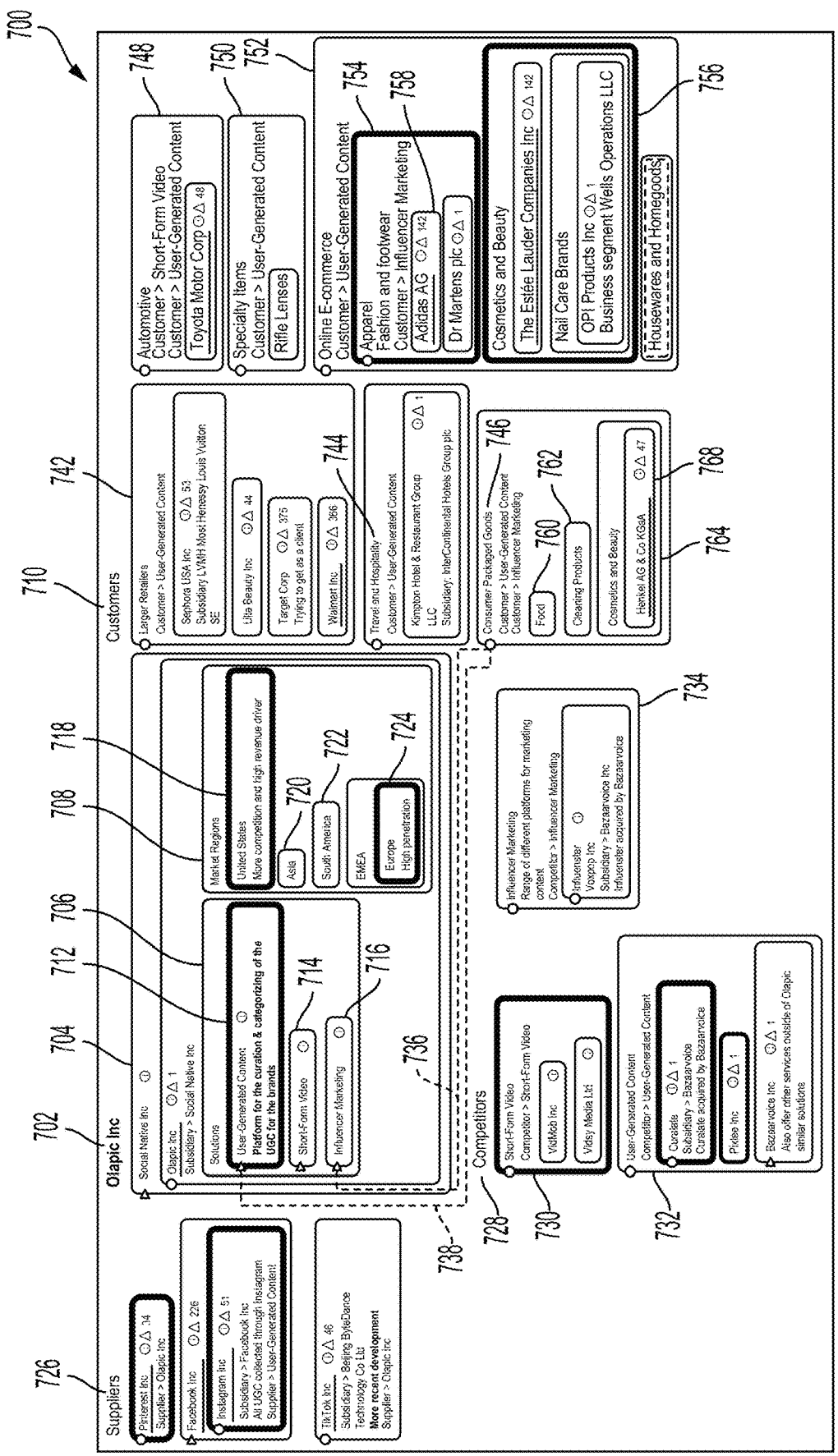
FIG. 7 is a conceptual diagram illustrating an example of an entity graph in a user interface of an Entity Graph Capture Tool, in accordance with some examples.
Figure 8A:
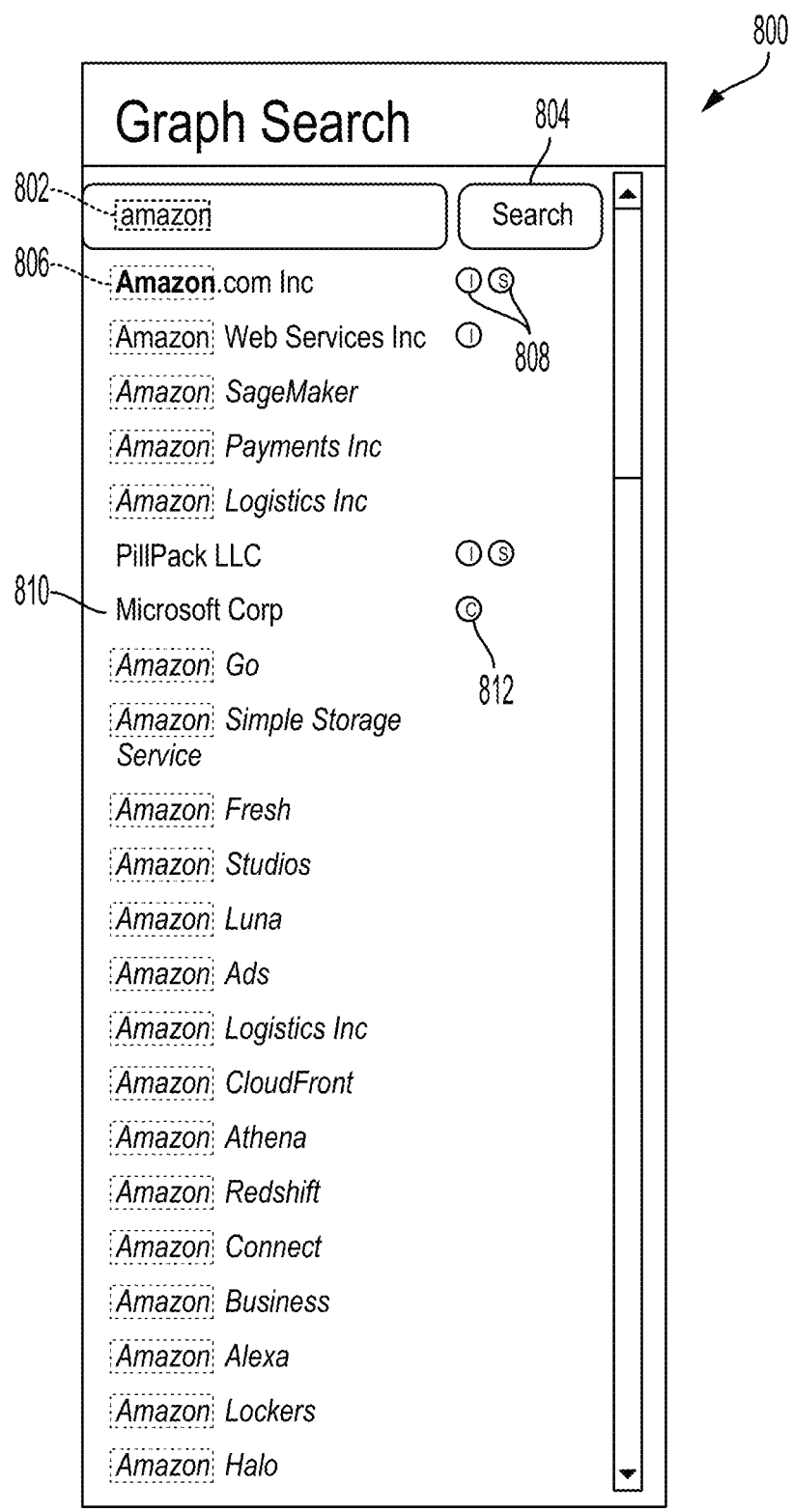
FIG. 8A is a conceptual diagram illustrating a user interface for searching for an entity graph, in accordance with some examples.

FIG. 7 is a conceptual diagram illustrating an example of an entity graph in a user interface 700 of an Entity Graph Capture Tool, in accordance with some examples. In some examples, the system 100 can determine a layout of a one-page graph in the Entity Graph Capture Tool/User Interface 112 based on the user interface's screen size available for display of the graph. Based on the screen size, the complexity of an entity's structure, and the number, types, and/or significance of relationships (e.g., competitors, suppliers, customers, etc.), the system 100 can compute box sizes and apply corresponding labels to and/or within the boxes in the graph.

For example, in FIG. 7, the graph section for "Olapic Inc." 702 shows the company structure information in the largest box 704. The largest box 704 is sized to fit the relevant structure information for Olapic Inc., which includes the solutions 706 Olapic Inc. provides and market regions 708 in which it provides its solutions 706. For the example shown, Olapic Inc. provides three different solutions 706 to its customers 710: User-Generated Content 712, Short-Form Video 714, and Influencer Marketing 716. The box for "User-Generated Content" 712 is highlighted with a thicker border because Olapic Inc. is a significant provider of this solution in comparison to Olapic Inc.'s other solutions. Further, Olapic Inc. operates in four market regions, as shown by the boxes representing the "United States" 718, "Asia" 720, "South America" 722, and "Europe" 724 (of the "EMEA," or Europe, Middle East and Africa region) regions. In this example, because Olapic Inc. operates most significantly in the United States 718 and Europe 724, the system 100 highlights those boxes with a thicker box.

Multiple other boxes are provided in the Olapic Inc. graph of user interface 700 to illustrate the relationships of Olapic Inc.'s suppliers 726, competitors 728, and customers 710 to Olapic Inc. For example, Olapic Inc.'s competitors 728 are categorized by the solutions 706 that Olapic Inc. provides to its customers 710. That is, Olapic Inc.'s competitors 728 are categorized under "Short-Form Video" 730, "User-Generated Content" 732, and "Influencer Marketing" 734. In this case, a user of the Olapic Inc. graph can easily see how Olapic Inc.'s competitors 728 are related to its organizational structure just by looking at the graph and recognizing the same labels in various parts of the graph.

In some examples, an entity's customers may be categorized differently from the entity's competitors. For example, Olapic Inc.'s customers 710 are categorized according to the specific markets from which the customers come. For example, Olapic Inc.'s customers 710 are categorized under "Larger Retailers" 742, "Travel and Hospitality" 744, "Consumer Packaged Goods" 746, "Automotive" 748, "Specialty Items" 750, and "Online E-commerce" 752, which is further categorized into "Apparel" 754 and "Cosmetics and Beauty" 756. Additional category breakdowns can be shown within the graph, and major players within those category breakdowns can be shown, for example, if they are important to the graph. For instance, Adidas AG 758 is shown as a major customer of apparel in Olapic Inc.'s online e-commerce operations.

In any case, connections, or link lines, can be rendered by the system 100 in the user interface 700 to show linkages between an entity structure, suppliers, competitors, and/or customers that may not be easily discernable just by looking at the entity graph. For example, link line 738 is rendered by the system 100 in the user interface 700 to show how customers of Olapic Inc.'s Consumer Packaged Goods 746 are related to Olapic Inc.'s User-Generated Content 712 solution. Similarly, link line 736 is rendered to show how customers of Olapic Inc.'s Consumer Packaged Goods 746 are related to Olapic Inc.'s Influencer Marketing 716 solution. These link lines can be rendered and appear automatically when the user hovers over the boxes for which such links exist. The link lines can automatically disappear when the user's mouse cursor is removed from hovering over a box.

The system 100 can determine how to break down the boxes in Olapic Inc.'s graph into the size and number of boxes necessary to show the structural and/or linked relationships between the boxes, as well as where to place the boxes in the graph, to ensure that all the boxes fit on a single page display of the graph, as shown in the example of FIG. 7. As relationships are updated in the database, the system 100 can reassess the relationships and update the hierarchy, breakdown, and/or placement of the boxes within the available screen size of the user interface 700. The system 100 can additionally decide whether to break boxes down to have multiple sub-boxes within a box, depending on the granularity of data available from the database, the significance of the data, and the available space on the screen size. For example, as shown under Consumer Packaged Goods 746, although "Food" 760, "Cleaning Products" 762, and "Cosmetics and Beauty" 764 are provided in sub-boxes, only Cosmetics and Beauty 764 is further broken down to indicate a significant customer (here, "Henkel AG & Co KGaA" 768). The significance of this customer can be indicated in the database as provided by the available data and/or as indicated by an agent based on the agent's knowledge of the relationship of this customer to Olapic Inc.

FIG. 8A is a conceptual diagram illustrating a user interface 800 for searching for a graph. According to an example, using user interface 800, a user can enter an entity name, such as "amazon" 802, into a search box of the user interface 800. Upon clicking Search 804, the Entity Graphs User Interface 122 can return comprehensive search results of all graph content in which "amazon" appears. The user interface 800 can return search results of graphs in which "amazon" appears in order of priority according to number of hits, strength of relationship of the search term, or significance of the graph with respect to the search term, for example. In the illustrated example of FIG. 8A, the "Amazon.com Inc." 806 graph is the most significant "amazon" related graph in the Entity Graphs Database 120. Clicking on the "Amazon.com Inc." 806 search result produces a graph of entity Amazon.com Inc. in the user interface 850 shown in FIG. 8B.

The search function illustrated by user interface 800 can provide other information usable for navigating the search results. For example, icons 808 and 812 provide additional graph hierarchy information regarding lower-level graphs that are available due to the size or complexity of the entity, or additional graphs that are available due to existing linked relationships to other entities. In the present example, icons 808 include a circled "I" and a circled "S." The circled "I" icon indicates that individual graphs exist for the search term in an entity's internal structure, e.g., there is a search term match of "amazon" in the company structure. The circled "S" indicates that the entities in question are matched to the search term as a supplier; e.g., an entity is an "amazon"

supplier (circled "S") of Amazon.com Inc. Additional icons can represent other attributes, such as a circled "C" for a match of the search term to a competitor, or a circled "Cu" for a match of the search term to a customer, for example.

These icons can also be color coded to coincide with the graph portions that appear when the entity is selected in the search results and the graph of the entity is rendered in the user interface 850. For example, structure portions of a graph can be rendered in the graph in yellow; supplier portions of a graph can be rendered in the graph in blue; customer portions of a graph can be rendered in the graph in green; and competitor portions of a graph can be rendered in the graph in red, as a few non-limiting examples. Color coding of the graph sections can aid a user in more easily distinguishing the structure, supplier, customer, and competitor portions of the graph.

It is additionally noted that all graph names in the search results do not necessarily contain the search term (e.g., "amazon"); rather, the search results may return the name of graphs for which "amazon" appears in the graph itself. For example, "Microsoft Corp" 810 appears in the search results because "amazon" is found to be linked to "Microsoft Corp" in a competitor graph of Microsoft Corp. The relationship is apparent in the search results because icon 812 (circled "C") indicates that "amazon" appears in a competitor graph of Microsoft Corp. Thus, a user can get a sense of the linked graph structure, e.g., what relationships for "amazon" are available to display in other graphs, before clicking into the search results to reveal a graph.

Figure 8B:
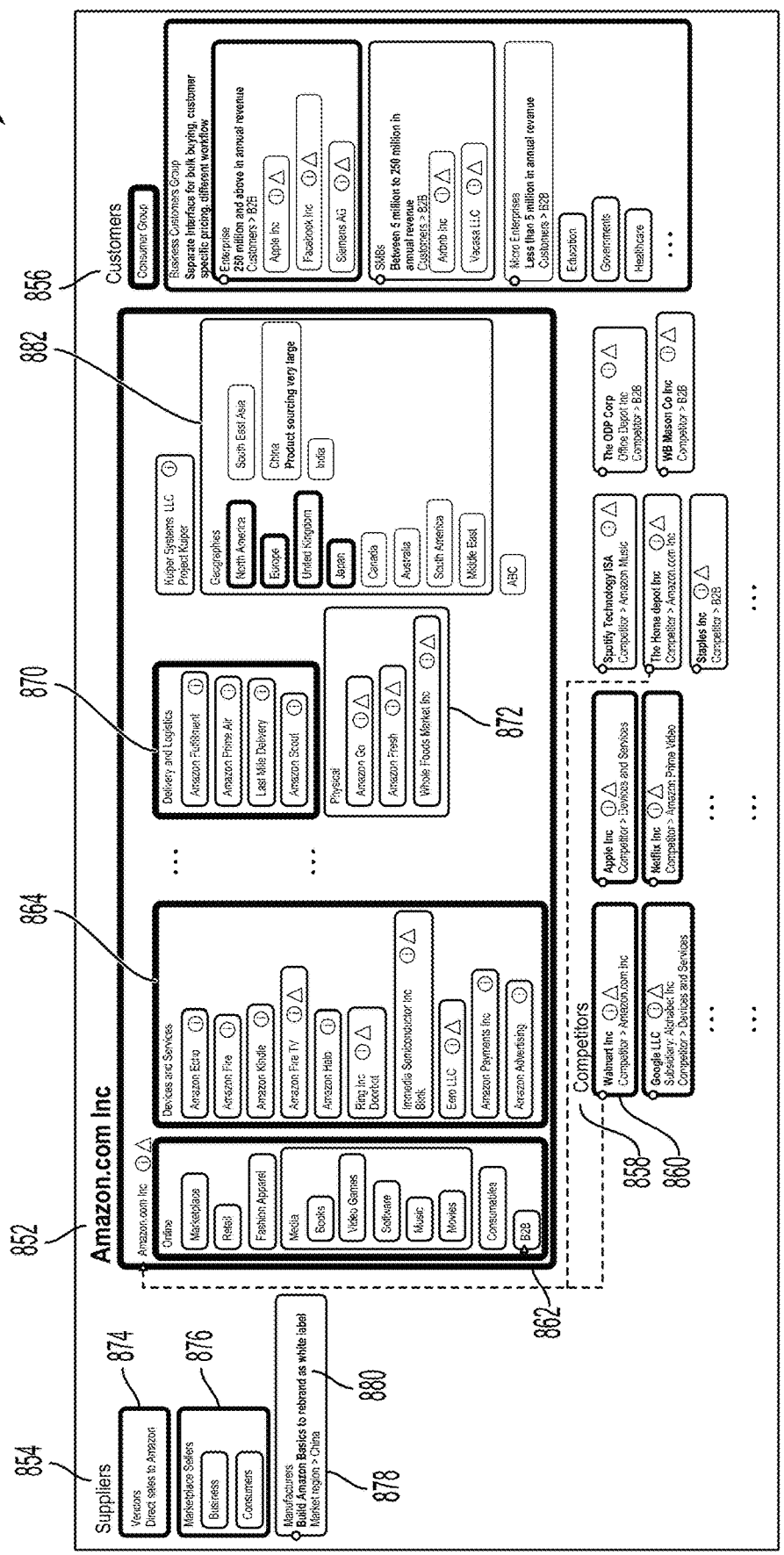
FIG. 8B is a conceptual diagram illustrating an example of a linked graph for attributes of a first entity in a user interface of an Entity Graphs Tool, in accordance with some examples.

As one example of an interactive graph, FIG. 8B illustrates user interface 850 of the Entity Graphs User Interface 122 for dynamic interactive graphing of an Amazon.com graph, which can be opened from the search results in user interface 800 after selecting "Amazon.com Inc." As illustrated in FIG. 8B, user interface 850 provides the graph of the entity Amazon.com Inc. organized by the entity's organizational structure 852, suppliers 854, customers 856, and competitors 858. Each of these parts of the graph are automatically placed in the graph according to amount of content, type of information displayed, complexity of the relationships among the graph parts, and space available in the screen hosting the user interface 850.

As seen in the user interface 850 of FIG. 8B, as compared to the user interface 700 of FIG. 7, the graph for Amazon.com Inc. in FIG. 8B is significantly larger and more complex than Olapic Inc.'s graph in FIG. 7. In FIG. 8B, the box representing Amazon.com Inc.'s structure 852 takes up a relatively larger display section of Amazon.com Inc.'s graph. In this example, the structure itself is a significant part of Amazon.com Inc.'s organization. Thus, the structure shows a greater amount of granular detail, listing the sectors in which Amazon.com Inc. operates (e.g., Online 862, Devices and Services 864, Delivery and Logistics 870, Physical (brick and mortar) 872, etc.). However, although Amazon.com Inc.'s suppliers 854 are great in number, they are not listed by name in Amazon.com Inc.'s graph due to lack of available space in the screen. In this case, a user can click into each of the boxes under "Suppliers" 854 (that is, "Vendors" 874, "Marketplace Sellers" 876, and "Manufacturers" 878) to get more detail.

As seen in the user interface 850 of FIG. 8B, appearance of a box for a related entity in Amazon.com Inc.'s graph, such as borderline thickness/weight of the box, can indicate the importance of the relationship of the related entity to Amazon.com Inc. For example, the greater thickness/weight can represent a related entity that is a major contributor to the Amazon.com Inc.'s total revenue. Segments with thicker borderlines can represent Amazon's largest businesses, such as Online 862, Devices and Services 864, Delivery and Logistics 870, etc. Conversely, for a smaller, or less important business, such as Amazon's Physical 872 (brick and mortar) businesses, including Amazon Go or Amazon Fresh, which are not relatively major contributors to Amazon's total revenue, the segment borderlines can have less thickness/weight.

As another example, an individual graph segment can represent a part of an entity operating in a specific geography. Furthering the example of FIG. 8B, the box Geographies 882 indicates that Amazon.com Inc. operates mostly in North America, Europe, the United Kingdom, and Japan, where Amazon may have greater than 70 percent share of business in a certain industry sector, for example. A greater borderline thickness for these industry sectors in these geographies can represent the greater share of Amazon.com Inc.'s revenue in the sectors for these geographies.

Thus, thickness of the box lines thus can visually indicate a relative importance of an entity in comparison to the entities around it. The thickness of the lines of the boxes can be determined manually by an agent's inputs to the user interface regarding relative importance, for example, by identifying a major entity or important market region. The thickness of the lines of the boxes can also be determined automatically, as further described in this specification.

To indicate varying significance within the suppliers, competitors, or customers of a graph, the appearance of labels within a box of a graph can be different and can have, for example, different font sizes or font characteristics, such as bold, italic, underlined, or capitalized font. For example, the bolding of the label "Build Amazon Basics to rebrand as white label" 880 can indicate that significant data is available by clicking on the "Manufacturers" 878 box. In this case, the one or more algorithms of the system 100 can determine that an amount of significant information is available to display in a separate graph, information which would not otherwise have space to fit on the current Amazon.com Inc. graph. Thus, if the significant information cannot fit in the graph, the information can be summarized under a bolded label, for example, and then be displayed in another linked graph.

Figure 9:
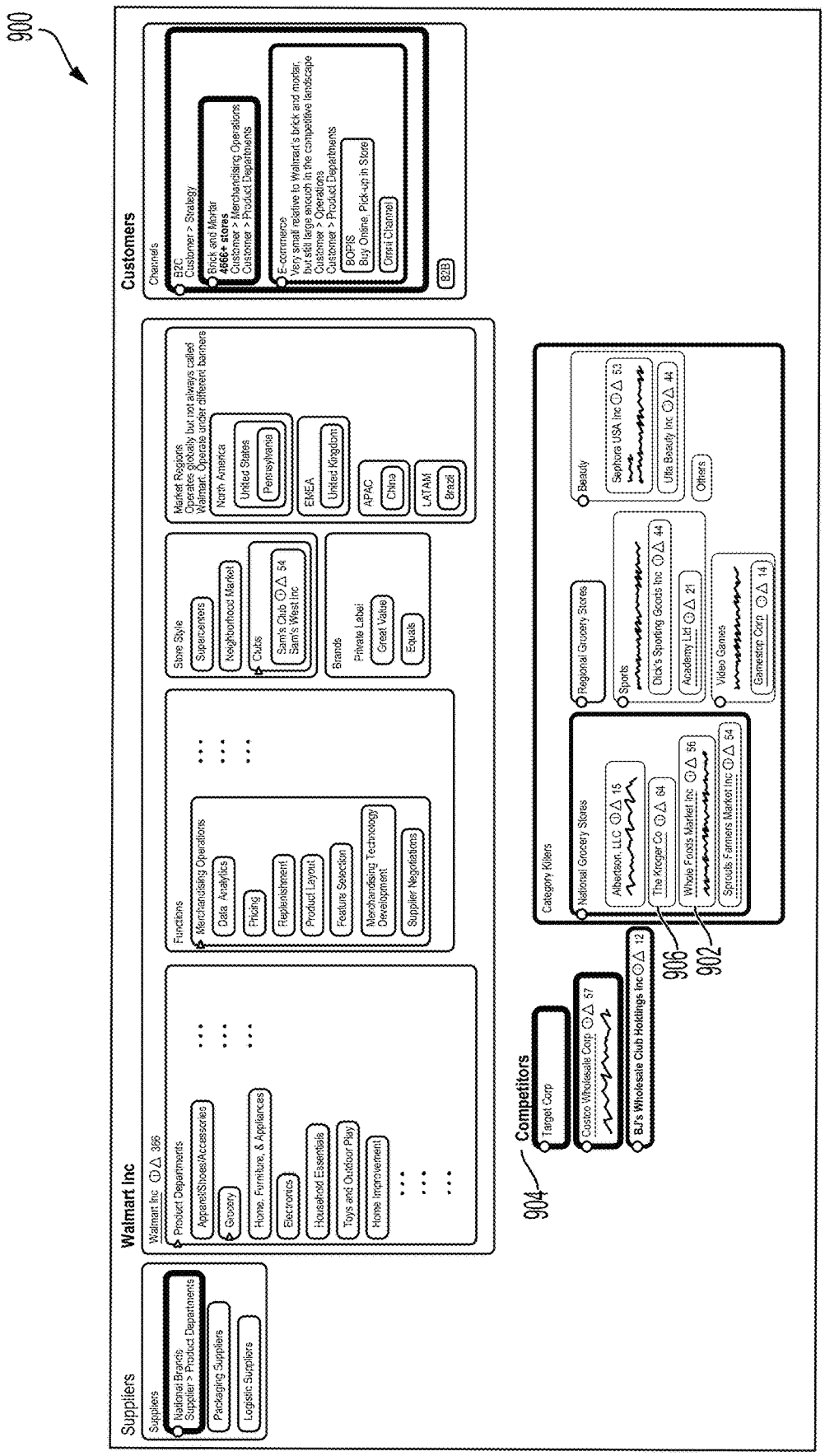
FIG. 9 is a conceptual diagram illustrating an example of a linked graph for attributes of a second entity in a user interface of an Entity Graphs Tool, in accordance with some examples.

FIG. 9 is a conceptual diagram illustrating another example of a linked graph for attributes of a second entity ("Walmart Inc") in the user interface 900 of the Entity Graphs User Interface 122 for dynamic interactive graphing. The graph of FIG. 8B may be linked to the graph of FIG. 9. For example, a user who finds Walmart Inc. to be an interesting competitor of Amazon.com Inc., and wants to know more details about Walmart Inc., can click into a graph of Walmart Inc. by clicking on the competitor box for Walmart Inc. 860 in the user interface 850 example of FIG. 8B. The one-click action can save time and effort that would conventionally be required to look up Walmart Inc.'s data, including Walmart Inc.'s company structure and Walmart Inc.'s competitors, customers, and suppliers. This one-click action will open and display a graph of Walmart Inc. as illustrated in user interface 900 of FIG. 9. Thus, the Walmart Inc. graph is easily linked to the Amazon.com Inc. graph due to the competitor relationship shown in the Amazon.com Inc. graph.

A relationship symmetry may or may not be evident to a user in each of the linked graphs, depending on the nature and complexity of the relationships in each graph. For example, where Amazon.com Inc.'s graph may include Walmart Inc. as a major competitor in one segment, Amazon.com Inc.'s graph may also include Walmart Inc. as a major customer in another segment. At the same time, Walmart Inc.'s graph may include Amazon's subsidiary Whole Foods as a major competitor in yet another segment. While Walmart Inc. may not see Amazon as a major competitor in one industry sector, Amazon may see Walmart Inc. as its major competitor in that industry sector. The graph of Walmart Inc. can thus be drawn from the perspective of Walmart's organization, while the graph of Amazon.com Inc. can be drawn from the perspective of Amazon's organization. A user of the system can thus evaluate an entity from the perspective of the entity's graphed data or from the perspective of a related entity mapping to, that is, in relationship with, the entity.

Thus, it is additionally noted that linkages such as the example just described and as illustrated for FIGS. 8B and 9 could be symmetric or asymmetric. The linkage between Amazon.com Inc. and Walmart Inc. would be symmetric if both entities appeared as competitors in each other's graph. However, in this example, the linkage is asymmetric because Walmart Inc. 860 is linked to Amazon.com Inc. as a competitor of Amazon.com Inc., but Walmart Inc. does not include Amazon.com Inc. specifically as a competitor in Walmart Inc.'s graph. Instead, Walmart Inc.'s graph lists Whole Foods Market Inc. 902 in its Competitors 904, where Whole Foods Market Inc. 902 is a subsidiary of Amazon. Thus, asymmetries and symmetries can exist between graphs and be evident to a user by looking at the entities linked between each graph. Knowledge of these asymmetries and symmetries can be leveraged by system 100 to further build and link graphs.

As previously discussed, the elements of a graph (e.g., suppliers, customers and distribution, partners, competitors, etc.) can be automatically updated for the graph based on other graphs that link to one or more elements of the graph, and vice versa. For example, a graph for company A (Graph A, with competitors B and C) that is linked to a graph for company D (Graph D, with competitor A) can allow for an automatic update of Graph A to have competitors B, C, and D, and an automatic update of Graph D to have competitors A, B, and C. Each of A, B, C, and D that are matched will have their unique identifiers stored in the database. In such cases, the asymmetry of the linkages between various graphs can be leveraged automatically to further update the graphs, to fill in missing or incomplete information, or to enhance existing information in the graphs.

The one or more algorithms of system 100 can identify this asymmetry and backfill the information in the database to make the linkages more symmetric. The one or more algorithms of system 100 can assess and compare the competitors, customers, and suppliers, for example, for each entity, and determine where linkages do not have symmetry between entities. The one or more algorithms of system 100 can then automatically backfill this information by making the associated linkages in the database. The one or more algorithms of system 100 can assess and compare competitors, customers, and/or suppliers and can determine to backfill information for one or more of each, depending on the significance of the relationships, for example. As an example, although two graphs may have asymmetry between multiple pairs of entities, the system 100 may determine to create symmetry for only one of those pairs, if, for example, that pair is determined to be most significantly related or related by a certain threshold of significance. In this way, the system 100 can create larger, more detailed, and/or more holistic graphs for an entity. Additionally, or alternatively, the Entity Graphs Database 120 can be manually backfilled, or the Entity Graphs Database 120 can be backfilled by a combination of automatic and manual methods.

Further, the one or more algorithms of system 100 can assess the symmetry relationships from one entity to another entity or from one entity to many entities. For example, the system 100 can assess the linkages from Amazon.com Inc. to Walmart Inc. as competitors, and/or from Amazon (at the highest level of Amazon's business) to several of Amazon's competitors, and/or from Amazon to a competitor of Amazon and subsequently from Amazon to a competitor of the competitor of Amazon, that is, to a second (or deeper) level down in the linked graph structures.

FIG. 10 is a conceptual diagram illustrating an example of a linked graph for attributes of a third entity ("The Kroger Co.") in a user interface of an Entity Graphs User Interface 122. For instance, the linked graph for attributes of the third entity may be an example of a lower level link from the Amazon.com Inc. graph in FIG. 8B. Specifically, FIG. 10 illustrates user interface 1000 of the Entity Graphs User Interface 122 for dynamic interactive graphing, linking the graph of FIG. 9, which linked from FIG. 8B, to the graph of FIG. 10. If a user clicks on "The Kroger Co." 906 in the Walmart Inc. graph of FIG. 9, the system 100 will automatically open and render a graph for Kroger, as shown in user interface 1000 of FIG. 10. As can be seen in the graph for "The Kroger Co." in user interface 1000, "Walmart Inc." is symmetrically listed under Competitors as a major competitor of The Kroger Co.

As illustrated by these examples, it is seen that the system 100 can determine and/or allow a user to analyze how various entities in a multi-level chain of competition view their relationship with another entity (e.g., Amazon), as a competitor, a supplier, a customer, or otherwise. Similarly, the system 100 can evaluate how the other entity (e.g., Amazon) sees its relationships with these various entities. As a result of these evaluations, the system 100 can fill in the linkages between the entities automatically. This process of analysis and backfill can generate more comprehensive graph data (e.g., more linkages to competitors) and can provide investors a more holistic view of the ecosystem surrounding an entity such as those illustrated above.

FIGS. 11A and 11B are two parts of a conceptual diagram illustrating one example of a user interface 1100 of a Graph Manager 130 for dynamic interactive graphing, in accordance with some examples. The Graph Manager 130 is a user interface for managing the graphs that are in the Entity Graphs Database 120, from one application. According to some examples, the Graph Manager 130 can report on the number of graphs in the Entity Graphs Database 120. In the specific example shown in FIG. 11A, the Graph Manager 130 indicates, at 1102, that the Entity Graphs Database 120 includes 6373 created graphs that can be managed. The graph list 1104 can include all or some of the graphs that are in the Entity Graphs Database 120. According to some examples, an agent can use the user interface 1100 to select an entity name, for example, a company name such as Amazon.com Inc. 1106 or a name of a division of Amazon such as Amazon Fresh 1108 from the Graph Manager's graph list 1104 to manage the selected graph for that entity. A user can also create a graph by selecting the New Graph button 1116. In the example of FIG. 11A, a user has selected an existing graph, Amazon.com Inc. 1106, which is highlighted. This selection displays the information in the second half of the user interface 1100 of Graph Manager 130, as shown in FIG. 11B.

Continuing with FIG. 11A, via the Graph Manager 130, the graphs in the Entity Graphs Database 120 can be filtered 1110 by owner, consolidator, status, progress, and availability, for example. Further, the graphs can be ordered 1112 by an existing entity or other search term. For example, the list of graphs can be ordered by the term "amazon," which, in the example shown in FIG. 11A, lists 899 graphs related to "amazon." The list of graphs in the Graph Manager 130 provides data about the graphs that a user can manage. For example, the fourth and selected graph 1106 listed in the list of graphs is for "Amazon.com Inc." The Graph Manager 130 provides identifying data for each graph, including, as shown for the selected "Amazon.com Inc." graph 1106, interview information from which the graph data was populated, including date and time (e.g., 08/06/2022, 13:25:00) of the interview and agent (e.g., Han Som Jack) interviewed. As also shown in the graph selection, the Graph Manager 130 additionally lists the owner (e.g., Pat Star) of the graph data. The Graph Manager 130 also provides a visual representation 1114 of the data in the graph, with a first set of boxes representing the entity and its subsidiaries, a second set of boxes representing suppliers, a third set of boxes representing competitors, and a fourth set of boxes representing customers, each with sizes showing relative importance according to one or more heuristics (e.g., revenue, profit, loss, number of people, diversity, number of other graphs that reference the data, or a combination thereof).

Once a graph is selected from the graph list (e.g., Amazon.com Inc. 1106), details about the graph can be viewed and managed, as shown in FIG. 11B. For example, in sections 1118 and 1128 of the user interface 1100, various details about the graph can be edited, e.g., entity name, agent, language, status, progress, and graph availability. When the graph information is complete, the user can "Request Consolidation" 1120, and/or the user can enter the Entity Graph Capture Tool through the "Knowledge Grapher" 1122 or enter the Consolidation Tool 1124. Via these portals 1120, 1122, 1124, the user can make further edits to the graph data, including adding links and attributes, manually or automatically, e.g., by the Matching Engine 128. In some examples of user interface 1100, existing agent knowledge for the selected graph and current agent can be shown, in graphed form, in a preview mode 1126. A user of user interface 1100 can indicate when management of a particular graph is complete and/or ready for updating in the Entity Graphs Database 120 and thus ready for use.

Figure 12:
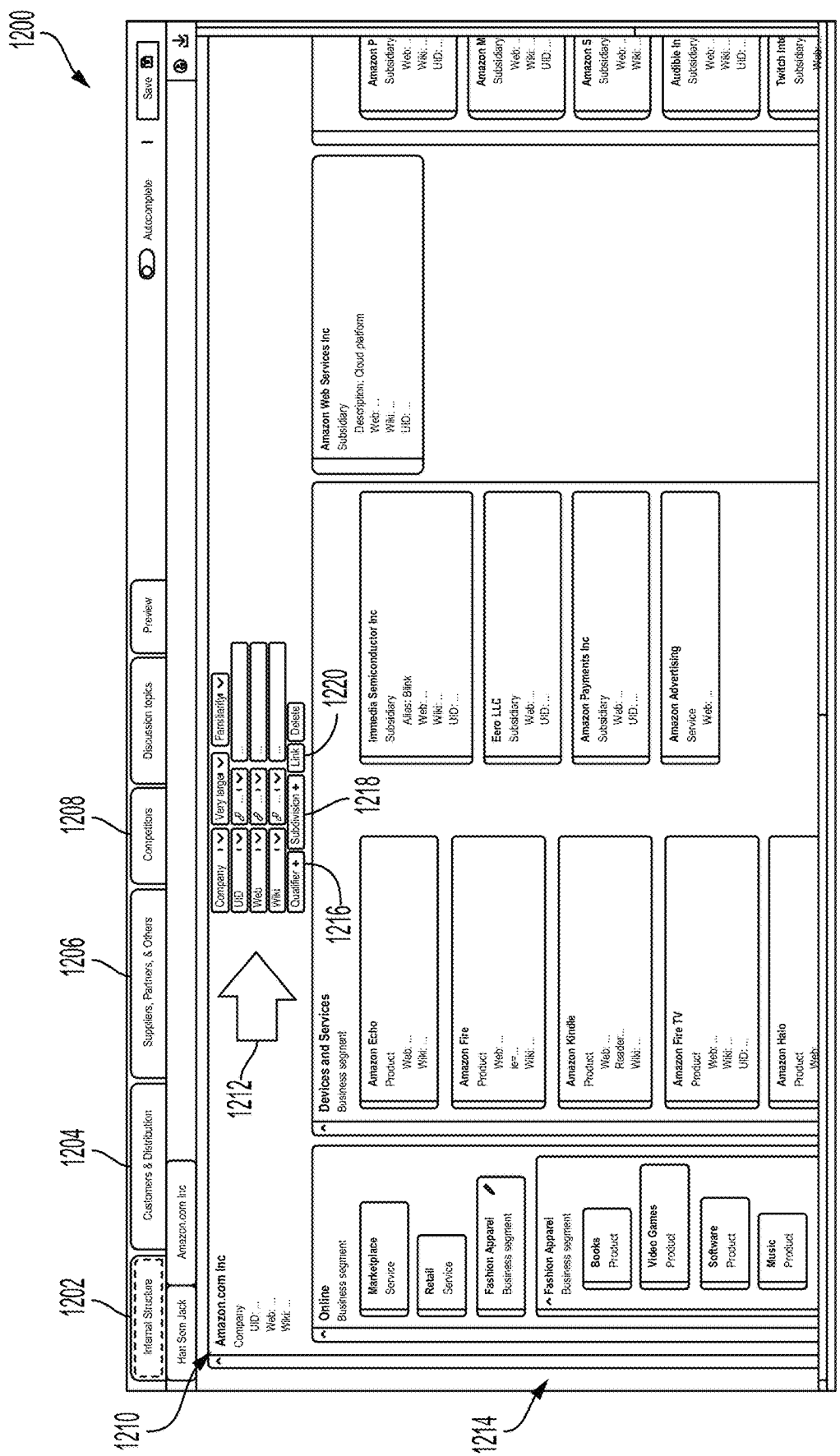
FIG. 12 is a conceptual diagram illustrating an example of a user interface of the Entity Graph Capture Tool, in accordance with some examples.

FIG. 12 is a conceptual diagram illustrating an example of a Knowledge Grapher user interface 1200 of the Entity Graph Capture Tool, in accordance with some examples. Upon entering the Knowledge Grapher user interface 1200, an agent can add and/or edit attributes for the entity graph selected in the Graph Manager 130 of user interface 1100 of FIG. 11A. Attributes can be added and/or edited for each menu tab of the Knowledge Grapher user interface 1200. For example, a user can add or enter attributes for a graph's Internal Structure 1202, Customers & Distribution 1204, Suppliers, Partners & Others 1206, and Competitors 1208, as indicated by the series of menu tabs across the top of the Knowledge Grapher user interface 1200.

For example, as shown in FIG. 12, a user can add or edit information 1210 about an entity's internal structure, including a UID, entity website link, and Wikipedia link, where the large arrow 1212 indicates the Knowledge Grapher user interface 1200 in edit mode. The Knowledge Grapher user interface 1200 additionally shows the existing parts 1214 of the entity's internal structure, although the Entity Graph Capture Tool has not yet organized the elements into a layout to fit a one-page graph. Thus, a user can review the data contents in an organized display of the internal structure before the data contents are graphed. A user can further add structural data to the entity's internal structure. For example, a user can add a Qualifier 1216, Subdivision 1218, or Link 1220 to the entity's internal structure.

Figure 13:
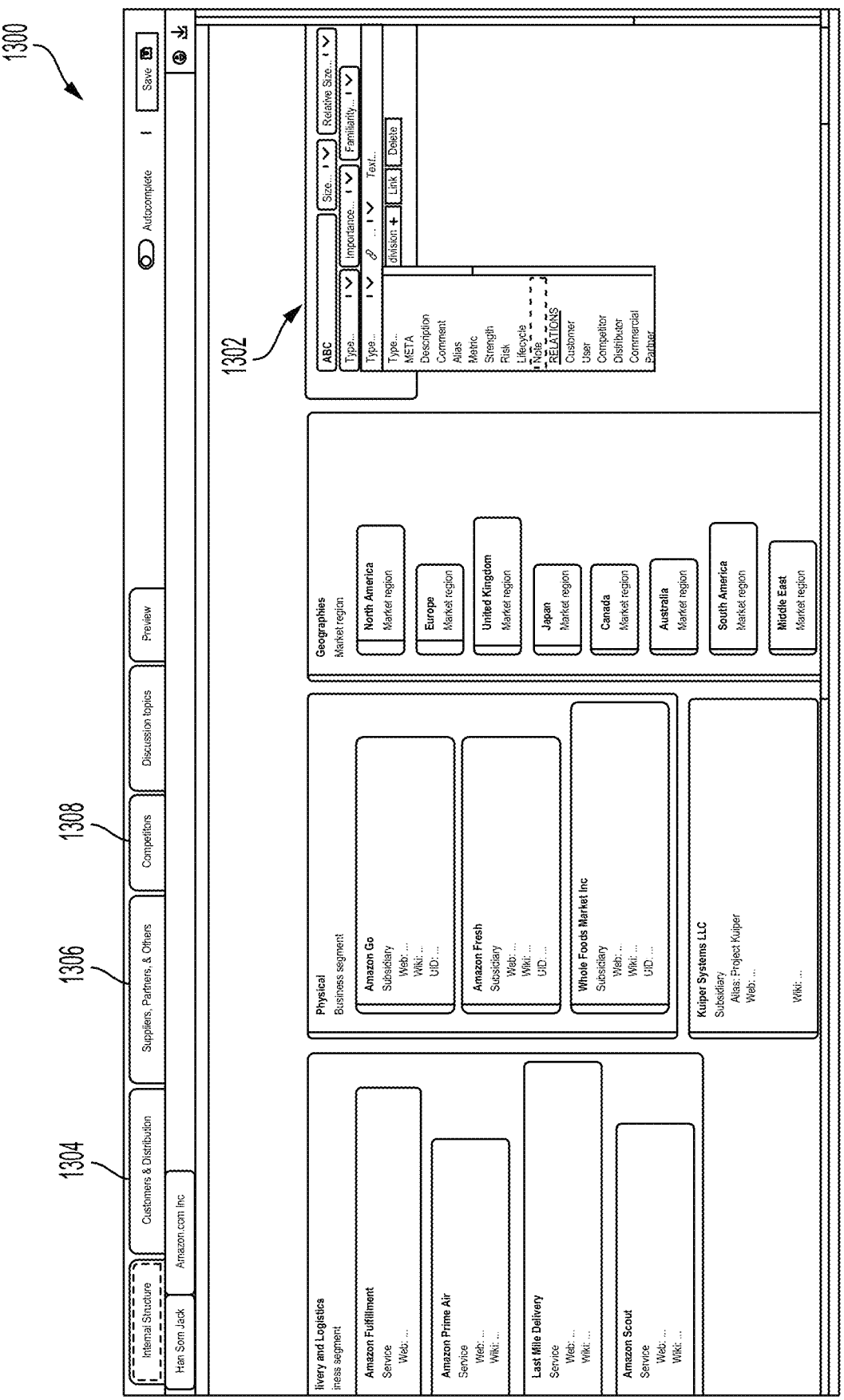
FIG. 13 is a conceptual diagram illustrating an example of a user interface of the Entity Graph Capture Tool, in accordance with some examples.

FIG. 13 is a conceptual diagram illustrating an example of a Knowledge Grapher user interface 1300 of the Entity Graph Capture Tool, in accordance with some examples. Upon selecting Qualifier 1216 in Knowledge Grapher user interface 1200, the Knowledge Grapher will open another editable interface 1302, as shown in user interface 1300, that allows the user to add a qualifier, such as metadata or a relationship, about an element in the internal structure. For example, user interface 1300 allows the user to add a metric, strength, or risk as metadata. User interface 1300 allows the user to also add an entity customer, competitor, or distributor, for example, as a relationship type. The user can similarly add a qualifier, such as size, relative size, importance, and/or familiarity, to any element in the internal structure via user interface 1300. In some examples, user interface 1300 allows a user to also add a subdivision or link to any element in the internal structure.

When edits are complete to the Internal Structure, a user can move on to the other tabs in the Knowledge Grapher user interface 1300, to add or edit data for the entity's Customers & Distribution 1304; Suppliers, Partners & Others 1306; and/or Competitors 1308, via the respective tabs of the user interface 1300. Once an agent has completed edits and/or additions to the data, the data can then be automatically used to generate a graph for the entity.

Figure 14:
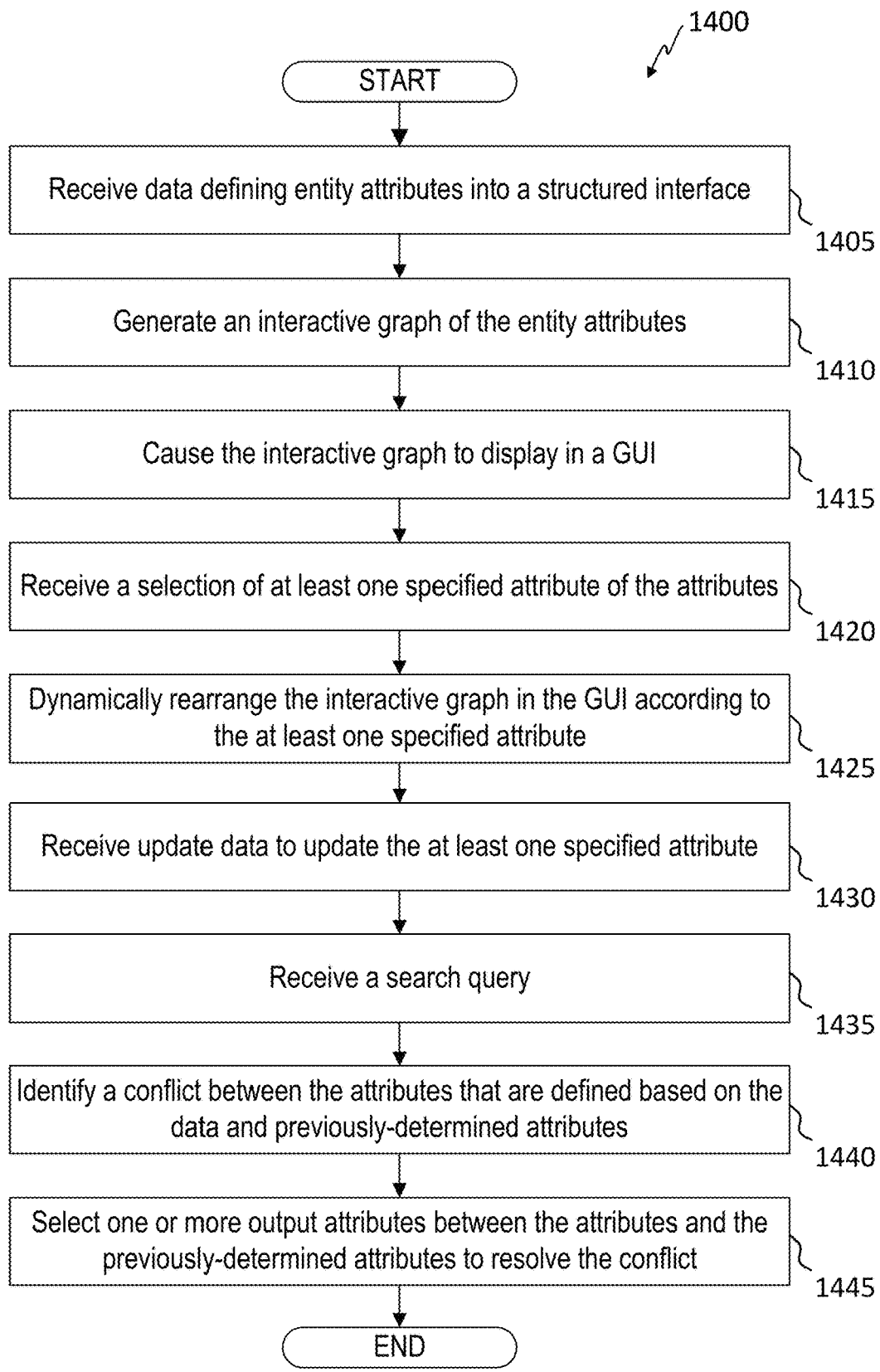
FIG. 14 is a flow diagram illustrating a process for dynamic interactive graphing, in accordance with some examples.
Figure 15:
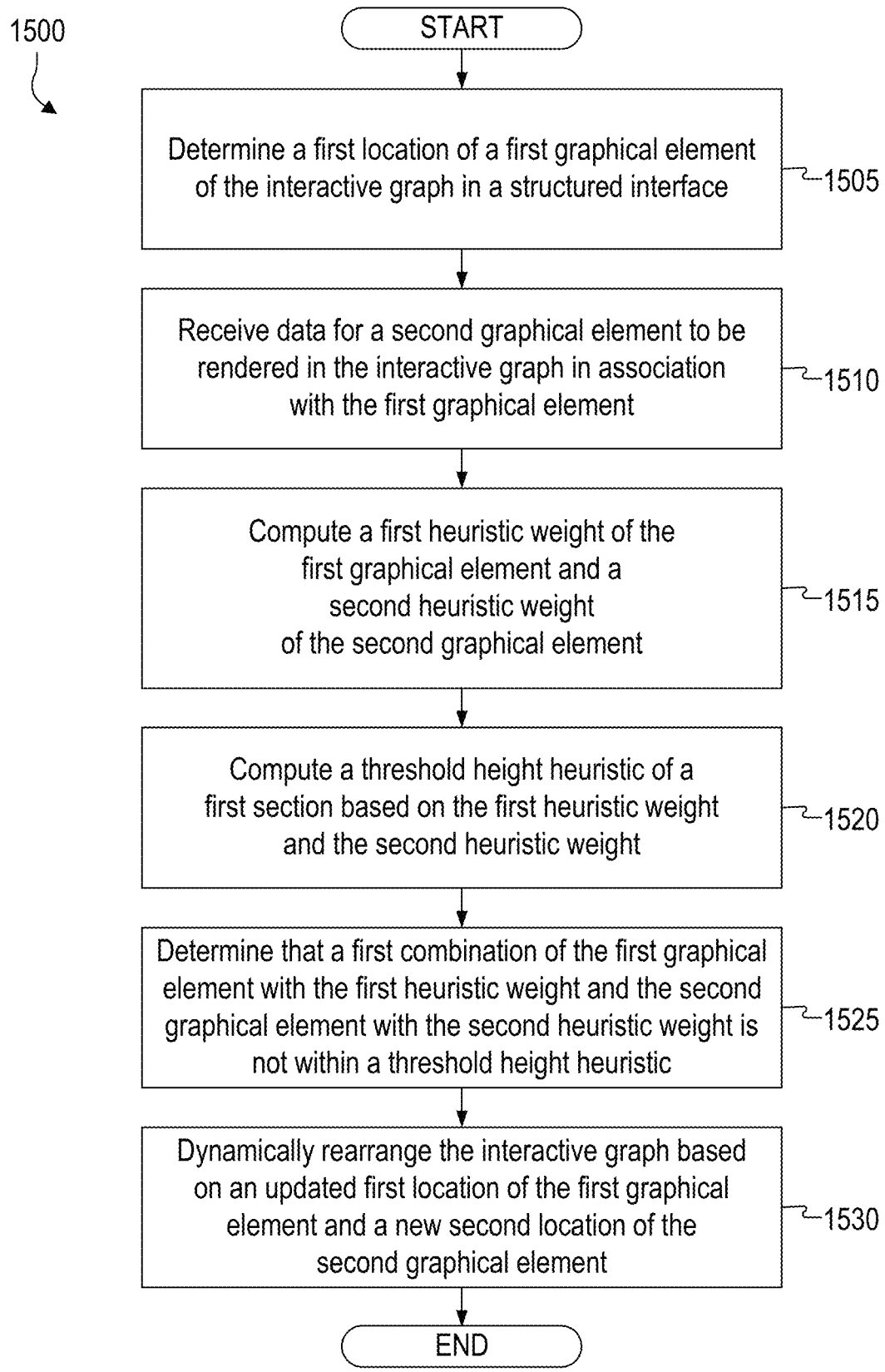
FIG. 15 is a flow diagram illustrating a process for optimizing the arrangement of graph information, in accordance with some examples.

FIGS. 14 and 15 depict example methods 1400 and 1500, respectively, as described below. Although the example methods 1400 and 1500 each depict a particular sequence of operations, the sequence may be altered without departing from the scope of the present disclosure. For example, some of the operations depicted may be performed in parallel or in a different sequence that does not materially affect the function of the methods 1400 and 1500. In other examples, different components of an example device or system that implements the methods 1400 and/or 1500 may perform functions at substantially the same time or in a specific sequence. The operations of the methods 1400 and 1500 can be performed, separately or in combination, by a system.

The system can include, for instance, the system 100, the Specialist Pipeline Manager 102, the Specialist Workflow and Selection Tool 104, the Entity Sourcing and Coverage Tool 106, the Consultation and Interview Capture Tool/User Interface 108, the Consolidation Tool and User Interface 110, the Entity Graph Capture Tool/User Interface 112, the Consultations and Interviews Database 114, the consultation and interview (C & I) data 116, the Scoring Database 118, the Entity Graphs Database 120, the Entity Graphs User Interface 122, the machine learning engine 124, the ML model(s) 126, the matching engine 128, the Graph Manager 130, the computing system 200, the cloud computing system 300, user terminal(s) 302, the server(s) 304, the database 306, the cloud computing resources 320, the cloud servers 322, cloud databases 324, cloud storage 326, cloud networks 328, the user interface 400, the user interface 500, the user interface 600, the user interface 700, the user interface 800, the user interface 850, the user interface 900, the user interface 1000, the user interface 1100, the user interface 1200, the user interface 1300, or a combination thereof.

FIG. 14 is a flow diagram illustrating the method 1400 for dynamic interactive graphing, in accordance with some examples. According to some examples, the method 1400 can include receiving data input into a structured interface at block 1405. For example, the system 100 illustrated in FIG. 1, including a device of computing system 200 illustrated in FIG. 2, can receive data input into a structured interface. The data input into the structured interface can include various attributes defining an entity. The attributes can include different parts of an entity, different regions that the entity operates in, different suppliers for the entity, different competitors of the entity, and/or different groups of customers of the entity, for example. The attributes can also include other attributes defining an entity as disclosed in this specification and as contemplated by a person of ordinary skill in the relevant art.

The structured interface can define relationships between the attributes. The attributes can be categorized into attribute types that can include categorizations based on: different parts, sections, sectors, structure, or departments of an entity; different sectors, markets, branding positions, or regions with or within which the entity operates; different suppliers for the entity, where different types of suppliers can be further categorized; different competitors of the entity, where different types of competitors can be further categorized; different groups of customers of the entity, where the different groups can be further categorized; and other categorizations as contemplated by a person of ordinary skill in the relevant art. Relationships between the attributes can be based on these different categorizations. Examples of the structured interface can include the user interfaces 400, 500, 600, 1100, 1200, and 1300.

According to some examples, the method 1400 can include generating an interactive graph of the attributes at block 1410. Examples of the interactive graph include the interactive graphs illustrated in the user interfaces 700, 850, 900, and 1000. For example, the system 100 illustrated in FIG. 1, including a device of computing system 200 illustrated in FIG. 2, can generate an interactive graph of the attributes. As one example, the different parts can be arranged within the interactive graph based on relative weight of the different parts according to respective heuristics corresponding to the different parts. As another example, the different regions can be arranged within the interactive graph based on relative weight of the different regions according to respective heuristics corresponding to the different regions. As a further example, the different competitors can be arranged within the interactive graph based on relative weight of the different competitors according to respective heuristics corresponding to the different competitors. According to another example, the different suppliers can be arranged within the interactive graph based on relative weight of the different suppliers according to respective heuristics corresponding to the different suppliers. Further, the different groups of customers can be arranged within the interactive graph based on relative weight of the different groups of customers according to respective heuristics corresponding to the different customers.

A heuristic for an attribute can be associated with at least one of revenue associated with the attribute, profit associated with the attribute, loss associated with the attribute, number of people associated with the attribute, size of the attribute, diversity associated with the attribute, number of appearances of the attribute in other interactive graphs, or any other type of heuristic contemplated by a person of ordinary skill in the art. The attributes can be further arranged within the interactive graph according to the relationships, where the relationships can be based on or associated with any one or more of the heuristics. The attributes can be arranged within the interactive graph according to different weights based on respective heuristics corresponding to the attributes.

According to some examples, the method 1400 can include presenting the interactive graph using a graphical user interface (GUI), or otherwise causing the interactive graph to display in a GUI, at block 1415. For example, the system 100 illustrated in FIG. 1, including a device of computing system 200 illustrated in FIG. 2, can present the interactive graph using a GUI such as those described generally for Entity Graphs User Interface 122 and for the example user interfaces 700, 850, 900, 1000 of FIGS. 7, 8B, 9, and 10, respectively.

According to some examples, the method 1400 can include receiving a selection of at least one specified attribute of the attributes at block 1420. For example, the system 100 illustrated in FIG. 1, including a device of computing system 200 illustrated in FIG. 2, can receive a selection of at least one specified attribute of the attributes. The system 100, for example, can receive a selection of at least one specified attribute as described in this specification. Various non-limiting examples of receiving a selection of at least one specified attribute are provided in the descriptions of FIGS. 7, 8A, 8B, 9, 10, 11A, 11B, 12, and 13.

According to some examples, the method 1400 can include dynamically rearranging the interactive graph in the graphical user interface based on the selection of the at least one specified attribute of the attributes at block 1425. For example, the system 100 illustrated in FIG. 1, including a device of computing system 200 illustrated in FIG. 2, can rearrange the interactive graph dynamically in the graphical user interface based on the selection of the at least one specified attribute of the attributes. The at least one specified attribute can be categorized into the specified attribute type. Rearranging the interactive graph dynamically in the graphical user interface based on the selection of the at least one specified attribute can include rearranging the interactive graph dynamically to provide additional information about a specified attribute type of the attribute types. Rearranging the interactive graph dynamically in the graphical user interface based on the selection of the at least one specified attribute can include rearranging the interactive graph dynamically to remove information about a second attribute in the interactive graph based on the second attribute being categorized into a different attribute type from the at least one specified attribute.

Further, the method 1400 can include determining sub-attributes of the at least one specified attribute. For example, the system 100 illustrated in FIG. 1, including a device of computing system 200 illustrated in FIG. 2, can determine sub-attributes of the at least one specified attribute. In some examples, performing the method 1400, the system 100 can add sub-attributes that are missing from the interactive graph prior to rearranging the interactive graph of the attributes. In other examples, the system 100 can supplement, update, or correct sub-attributes prior to rearranging the interactive graph and update the interactive graph.

Further, the method 1400 can include modifying the interactive graph dynamically in the graphical user interface to include the sub-attributes in relation to the at least one specified attribute. For example, the system 100 illustrated in FIG. 1, including a device of computing system 200 illustrated in FIG. 2, can modify the interactive graph dynamically in the graphical user interface to include the sub-attributes in relation to the at least one specified attribute.

According to some examples, the method 1400 can include receiving update data to update the at least one specified attribute at block 1430. For example, the system 100 illustrated in FIG. 1, including a device of computing system 200 illustrated in FIG. 2, can receive update data to update the at least one specified attribute. The at least one specified attribute can also appear in the one or more additional interactive graphs. Rearranging the interactive graph dynamically in the graphical user interface based on the selection of the at least one specified attribute can include updating the interactive graph and one or more additional interactive graphs using the update data.

According to some examples, the method 1400 can include receiving a search query at block 1435. For example, the system 100 illustrated in FIG. 1, including a device of computing system 200 illustrated in FIG. 2, can receive a search query. Generating an interactive graph of the attributes can also be based on the search query. The search query can be associated with one or more of the attributes. As a non-limiting example, the search query can be such as illustrated in FIG. 8A.

According to some examples, the method 1400 can include identifying a conflict between the attributes that are defined based on the data and previously-determined attributes at block 1440. For example, the system 100 illustrated in FIG. 1, including a device of computing system 200 illustrated in FIG. 2, can identify a conflict between one or more of the attributes that are defined based on the data and previously-determined attributes.

According to some examples, the method 1400 can include selecting one or more output attributes between the attributes and the previously-determined attributes to resolve the conflict at block 1445. For example, the system 100 illustrated in FIG. 1, including a device of computing system 200 illustrated in FIG. 2, can select one or more output attributes between the attributes and the previously-determined attributes to resolve the conflict. As a non-limiting example, the selecting can be based on input of the attributes and the previously-determined attributes into a trained machine learning model. The trained machine learning model can be, for example, one of the ML model(s) 126 of FIG. 1 and as described elsewhere in this disclosure.

FIG. 15 is a flow diagram illustrating an example method 1500 for optimizing the arrangement of graph information. Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

According to some examples, the method 1500 includes determining a first location of a first graphical element of the interactive graph in the structured interface at block 1505. For example, the processor 210 illustrated in FIG. 2 can determine a first location of a first graphical element of the interactive graph in the structured interface. For example, the first graphical element can be rendered in the first location in a first section of the interactive graph in the structured interface. The interactive graph can be organized in two or more sections.

According to some examples, the method 1500 includes receiving data for a second graphical element to be rendered in the interactive graph in the structured interface in association with the first graphical element at block 1510. For example, the processor 210 illustrated in FIG. 2 may receive data for the second graphical element to be rendered in the interactive graph in association with the first graphical element.

According to some examples, the method 1500 includes computing a first heuristic weight of the first graphical element based on the first location of the first graphical element and a second heuristic weight of the second graphical element based on a second location of the second graphical element at block 1515. For example, the processor 210 illustrated in FIG. 2 may compute the first heuristic weight of the first graphical element based on the first location of the first graphical element and the second heuristic weight of the second graphical element based on the second location of the second graphical element.

According to some examples, the method 1500 includes computing a threshold height heuristic of the first section of the two or more sections based on the first heuristic weight and the second heuristic weight at block 1520. For example, the processor 210 illustrated in FIG. 2 may compute the threshold height heuristic of the first section based on the first heuristic weight and the second heuristic weight.

According to some examples, the method 1500 includes determining that a first combination of the first graphical element with the first heuristic weight and the second graphical element with the second heuristic weight is not within the threshold height heuristic at block 1525. For example, the processor 210 illustrated in FIG. 2 may determine that the first combination of the first graphical element with the first heuristic weight and the second graphical element with the second heuristic weight is not within the threshold height heuristic.

According to some examples, the method 1500 includes dynamically rearranging the interactive graph based on an updated first location of the first graphical element and a new second location of the second graphical element at block 1530. For example, the processor 210 illustrated in FIG. 2 may dynamically rearrange the interactive graph based on the updated first location of the first graphical element and the new second location of the second graphical element. The dynamic rearranging may be performed according to the method in FIG. 16, for example.

Figure 16:
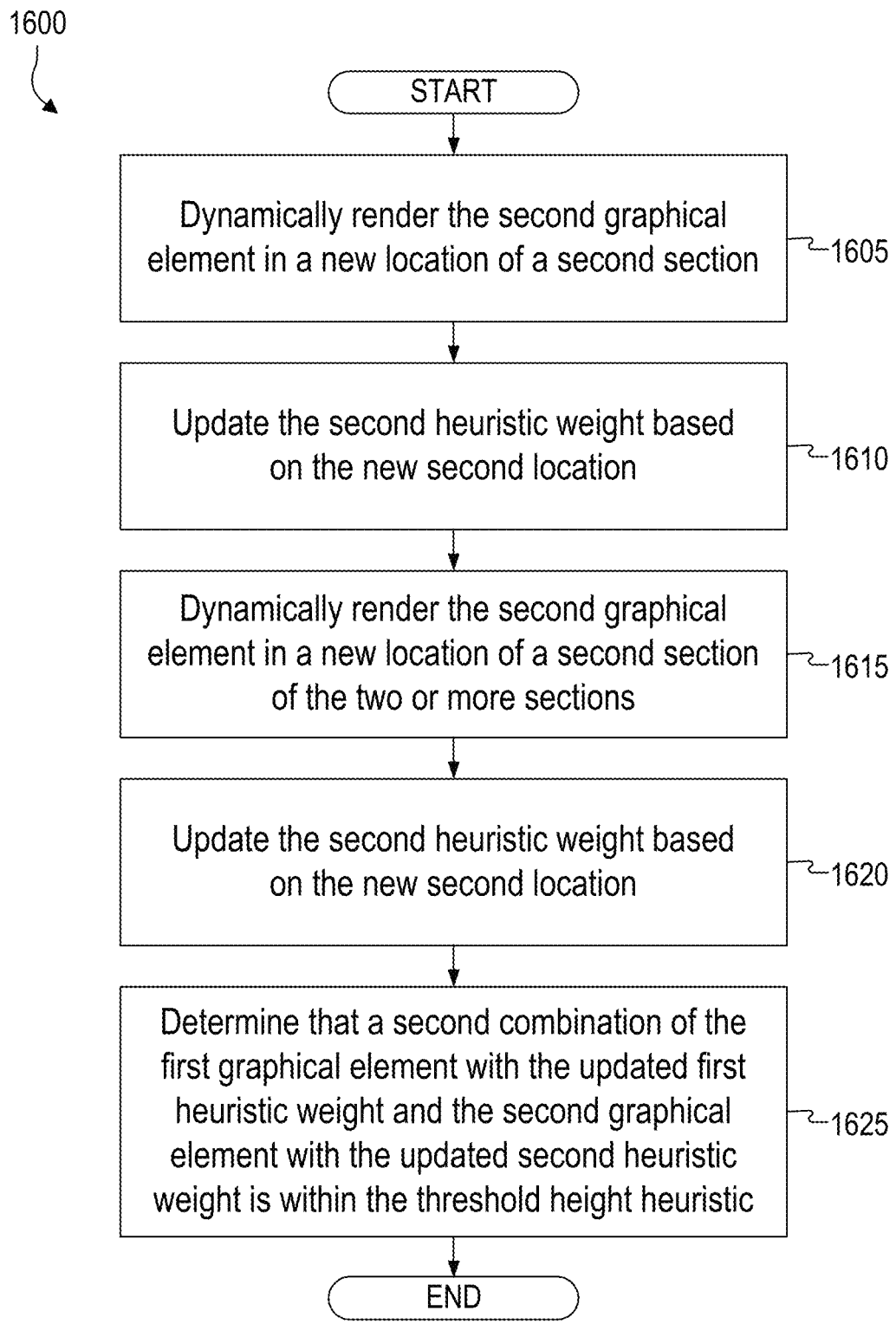
FIG. 16 is a flow diagram illustrating a process for dynamically relocating graphical elements in an entity graph, in accordance with some examples.

FIG. 16 illustrates an example method 1600 for dynamically relocating graphical elements in a graph. Although the example method 1600 depicts a particular sequence of operations, the sequence may be altered without departing from the scope of the present disclosure. For example, some of the operations depicted may be performed in parallel or in a different sequence that does not materially affect the function of the method 1600. In other examples, different components of an example device or system that implements the method 1600 may perform functions at substantially the same time or in a specific sequence.

According to some examples, the method 1600 includes dynamically rerendering the first graphical element in the first section in an updated first location at block 1605 and updating the first heuristic weight based on the updated first location at block 1610. For example, the processor 210 illustrated in FIG. 2 may dynamically rerender the first graphical element in the first section in the updated first location and update the first heuristic weight based on the updated first location.

According to some examples, the method 1600 includes dynamically rendering the second graphical element in the new second location of a second section of the two or more sections at block 1615. For example, the second section can be different from the first section. The method 1600 further includes updating the second heuristic weight based on the new second location at block 1620. For example, the processor 210 illustrated in FIG. 2 may dynamically render the second graphical element in the new second location of a second section of the two or more sections, the second section being different from the first section, and update the second heuristic weight based on the new second location.

According to some examples, the method 1600 includes determining that a second combination of the first graphical element with the updated first heuristic weight and the second graphical element with the updated second heuristic weight is within the threshold height heuristic at block 1625. For example, the processor 210 illustrated in FIG. 2 may determine that the second combination of the first graphical element with the updated first heuristic weight and the second graphical element with the updated second heuristic weight is within the threshold height heuristic.

The phrases "in some examples," "according to various examples," "in the examples shown," "in one example," "in other examples," "various examples," "some examples," and the like generally mean the particular feature, structure, or characteristic following the phrase is included in at least one example of the present embodiments, and may be included in more than one example of the present embodiments. In addition, such phrases do not necessarily refer to the same examples or to different examples.

Further, the aforementioned description is directed to devices and applications that are related to technology for dynamic interactive graphing of entity attributes. However, it will be understood by a person of ordinary skill in the relevant art that the technology can be extended to any device and application.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example Aspects of the Disclosure Include

Aspect 1. A method of dynamic interactive graphing, the method comprising: receiving data input into a structured interface, the data defining attributes of an organization, and the structured interface defining relationships between the attributes; generating an interactive graph of the attributes, the attributes arranged within the interactive graph according to the relationships; presenting the interactive graph using a graphical user interface; receiving a selection of at least one specified attribute of the attributes; rearranging the interactive graph dynamically in the graphical user interface based on the selection of the at least one specified attribute of the attributes.

Aspect 2. The method of Aspect 1, wherein the attributes include different parts of the organization, wherein the different parts are arranged within the interactive graph based on based on relative weight of the different parts according to respective heuristics corresponding to the different parts.

Aspect 3. The method of any of Aspects 1 to 2, wherein the attributes include different regions that the organization operates in, wherein the different regions are arranged within the interactive graph based on based on relative weight of the different regions according to respective heuristics corresponding to the different regions.

Aspect 4. The method of any of Aspects 1 to 3, wherein the attributes include different competitors of the organization, wherein the different competitors are arranged within the interactive graph based on based on relative weight of the different competitors according to respective heuristics corresponding to the different competitors.

Aspect 5. The method of any of Aspects 1 to 4, wherein the attributes include different suppliers for the organization, wherein the different suppliers are arranged within the interactive graph based on based on relative weight of the different suppliers according to respective heuristics corresponding to the different suppliers.

Aspect 6. The method of any of Aspects 1 to 5, wherein the attributes include different groups of customers of the organization, wherein the different groups of customers are arranged within the interactive graph based on based on relative weight of the different groups of customers according to respective heuristics corresponding to the different customers.

Aspect 7. The method of any of Aspects 1 to 6, wherein the attributes are arranged within the interactive graph according to different weights based on respective heuristics corresponding to the attributes, wherein a heuristic for an attribute is associated with at least one of revenue associated with the attribute, profit associated with the attribute, loss associated with the attribute, number of people associated with the attribute, size of the attribute, diversity associated with the attribute, or number of appearances of the attribute in other interactive graphs.

Aspect 8. The method of any of Aspects 1 to 7, wherein rearranging the interactive graph dynamically in the graphical user interface based on the selection of the at least one specified attribute includes: determining sub-attributes of the at least one specified attribute, wherein the interactive graph of the attributes is missing the sub-attributes prior to rearranging the interactive graph, and modifying the interactive graph dynamically in the graphical user interface to include the sub-attributes in relation to the at least one specified attribute.

Aspect 9. The method of any of Aspects 1 to 8, wherein the attributes are categorized into attribute types, wherein rearranging the interactive graph dynamically in the graphical user interface based on the selection of the at least one specified attribute includes rearranging the interactive graph dynamically to provide additional information about a specified attribute type of the attribute types, wherein the at least one specified attribute is categorized into the specified attribute type.

Aspect 10. The method of any of Aspects 1 to 9, wherein the attributes are categorized into attribute types, wherein rearranging the interactive graph dynamically in the graphical user interface based on the selection of the at least one specified attribute includes rearranging the interactive graph dynamically to remove information about a second attribute in the interactive graph based on the second attribute being categorized into a different attribute type from the at least one specified attribute.

Aspect 11. The method of any of Aspects 1 to 10, further comprising: receiving update data to update the at least one specified attribute, wherein rearranging the interactive graph dynamically in the graphical user interface based on the selection of the at least one specified attribute includes updating the interactive graph and one or more additional interactive graphs using the update data, wherein the at least one specified attribute also appears in the one or more additional interactive graphs.

Aspect 12. The method of any of Aspects 1 to 11, further comprising: receiving a search query, wherein the search query is associated with one or more of the attributes, wherein generating an interactive graph of the attributes is also based on the search query.

Aspect 13. The method of any of Aspects 1 to 12, further comprising: identifying a conflict between the attributes that are defined based on the data and previously-determined attributes; and selecting one or more output attributes between the attributes and the previously-determined attributes to resolve the conflict, wherein the selecting is based on input of the attributes and the previously-determined attributes into a trained machine learning model.

Aspect 14. A computer-implemented method of dynamic interactive graphing, the computer-implemented method comprising: receiving data input into a structured interface, the data defining attributes of an entity, and the structured interface defining relationships between the attributes; generating an interactive graph of the attributes, the generating comprising arranging the attributes within the interactive graph according to the relationships; causing the interactive graph to display in a graphical user interface; receiving a selection of at least one specified attribute of the attributes; and as a result of receiving the selection of the at least one specified attribute, dynamically rearranging the interactive graph in the graphical user interface according to the at least one specified attribute.

Aspect 15. The computer-implemented method of Aspect 14, wherein the attributes include different parts of the entity, and generating the interactive graph further comprises arranging the different parts within the interactive graph based on relative weight of the different parts according to respective heuristics corresponding to the different parts.

Aspect 16. The computer-implemented method of any of Aspects 14 to 15, wherein the attributes include different regions in which the entity operates, and generating the interactive graph further comprises arranging the different regions within the interactive graph based on relative weight of the different regions according to respective heuristics corresponding to the different regions.

Aspect 17. The computer-implemented method of any of Aspects 14 to 16, wherein the attributes include different competitors of the entity, and generating the interactive graph further comprises arranging the different competitors within the interactive graph based on relative weight of the different competitors according to respective heuristics corresponding to the different competitors.

Aspect 18. The computer-implemented method of any of Aspects 14 to 17, wherein the attributes include different suppliers to the entity, and generating the interactive graph further comprises arranging the different suppliers within the interactive graph based on relative weight of the different suppliers according to respective heuristics corresponding to the different suppliers.

Aspect 19. The computer-implemented method of any of Aspects 14 to 18, wherein the attributes include different groups of customers of the entity, and generating the interactive graph further comprises arranging the different groups of customers within the interactive graph based on relative weight of the different groups of customers according to respective heuristics corresponding to the different groups of customers.

Aspect 20. The computer-implemented method of any of Aspects 14 to 19, wherein generating the interactive graph further comprises arranging the attributes within the interactive graph according to different weights based on respective heuristics corresponding to the attributes, wherein a heuristic for an attribute is associated with at least one of revenue associated with the attribute, profit associated with the attribute, loss associated with the attribute, number of people associated with the attribute, size of the attribute, diversity associated with the attribute, or number of appearances of the attribute in other interactive graphs.

Aspect 21. The computer-implemented method of any of Aspects 14 to 20, wherein dynamically rearranging the interactive graph in the graphical user interface according to the at least one specified attribute includes: determining sub-attributes of the at least one specified attribute, wherein the interactive graph of the attributes is missing the sub-attributes prior to rearranging the interactive graph, and dynamically modifying the interactive graph in the graphical user interface to include the sub-attributes in relation to the at least one specified attribute.

Aspect 22. The computer-implemented method of any of Aspects 14 to 21, wherein the attributes are categorized into attribute types, and wherein dynamically rearranging the interactive graph in the graphical user interface includes providing additional information about a specified attribute type of the attribute types, wherein the at least one specified attribute is categorized into the specified attribute type.

Aspect 23. The computer-implemented method of any of Aspects 14 to 22, wherein the attributes are categorized into attribute types, and wherein dynamically rearranging the interactive graph in the graphical user interface includes removing information about a second attribute in the interactive graph based on the second attribute being categorized into a different attribute type from the at least one specified attribute.

Aspect 24. The computer-implemented method of any of Aspects 14 to 23, further comprising: receiving update data to update the at least one specified attribute, wherein dynamically rearranging the interactive graph in the graphical user interface includes updating the interactive graph and one or more additional interactive graphs using the update data, wherein the at least one specified attribute appears in the one or more additional interactive graphs.

Aspect 25. The computer-implemented method of any of Aspects 14 to 24, further comprising: receiving a search query, wherein the search query is associated with one or more of the attributes, and wherein generating an interactive graph of the attributes is based in part on the search query.

Aspect 26. The computer-implemented method of any of Aspects 14 to 25, further comprising: identifying a conflict between two or more of the attributes that are defined based on the data and previously-determined attributes; and selecting one or more output attributes based on the two or more of the attributes and the previously-determined attributes to resolve the conflict, wherein the selecting is based on input of the two or more of the attributes and the previously-determined attributes into a trained machine learning model.

Aspect 27. A system for dynamic interactive graphing, the system comprising: one or more processors; and memory storing executable instructions that, as a result of execution by the one or more processors, cause the system to: receive data input into a structured interface of the system, the data defining attributes of an entity, and the structured interface defining relationships between the attributes; generate an interactive graph of the attributes, wherein to generate the interactive graph, the executable instructions, as a result of execution by the one or more processors, further cause the system to arrange the attributes within the interactive graph according to the relationships; cause the interactive graph to display in a graphical user interface of the system; receive a selection, made via the graphical user interface, of at least one specified attribute of the attributes in the interactive graph; and as a result of receiving the selection of the at least one specified attribute, dynamically rearrange the interactive graph in the graphical user interface according to the at least one specified attribute.

Aspect 28. The system of Aspect 27, wherein execution of the executable instructions by the one or more processors further causes the system to: store, in a database of the system, the attributes according to categories comprising different parts of the entity, different regions in which the entity operates, different competitors of the entity, different suppliers to the entity, and different groups of customers of the entity; store, in the database of the system, the relationships between the attributes based in part on the categories; and dynamically update the database according to the data input into the structured interface.

Aspect 29. The system of any of Aspects 27 to 28, wherein to generate the interactive graph, execution of the executable instructions by the one or more processors further causes the system to: arrange the attributes within the interactive graph based in part, for each attribute, on a respective category of the categories, a relative weight within the respective category, and an assigned significance factor with respect to a role of each attribute within the interactive graph.

Aspect 30. The system of any of Aspects 27 to 29, wherein to generate the interactive graph, execution of the executable instructions by the one or more processors further causes the system to: arrange the attributes within the interactive graph according to different weights based on respective heuristics corresponding to the attributes, wherein a heuristic for an attribute is associated with at least one of revenue associated with the attribute, profit associated with the attribute, loss associated with the attribute, number of people associated with the attribute, size of the attribute, diversity associated with the attribute, or number of appearances of the attribute in other interactive graphs.

Aspect 31. The system of any of Aspects 27 to 30, wherein the attributes are categorized into attribute types, and wherein to dynamically rearrange the interactive graph in the graphical user interface, execution of the executable instructions by the one or more processors further causes the system to: remove information about a second attribute in the interactive graph based on the second attribute being categorized into a different attribute type from the at least one specified attribute.

Aspect 32. The system of any of Aspects 27 to 31, wherein execution of the executable instructions by the one or more processors further causes the system to: receive update data to update the at least one specified attribute; and update the interactive graph and one or more additional interactive graphs using the update data, wherein the at least one specified attribute appears in the one or more additional interactive graphs.

Aspect 33. The system of any of Aspects 27 to 32, wherein execution of the executable instructions by the one or more processors further causes the system to: identify a conflict between two or more of the attributes that are defined based on the data and previously-determined attributes; and select one or more output attributes based on the two or more of the attributes and the previously-determined attributes to resolve the conflict, wherein the selecting is based on input of the two or more of the attributes and the previously-determined attributes into a trained machine learning model.

Aspect 34. A computer-implemented method for dynamically rearranging an interactive graph in a structured interface, comprising: determining a first location of a first graphical element of the interactive graph in the structured interface, wherein the first graphical element is rendered in a first section of the interactive graph in the structured interface, and wherein the interactive graph is organized in two or more sections; receiving data for a second graphical element to be rendered in the interactive graph in the structured interface in association with the first graphical element; computing a first heuristic weight of the first graphical element based on the first location of the first graphical element and a second heuristic weight of the second graphical element based on a second location of the second graphical element; computing a threshold height heuristic of the first section of the two or more sections based on the first heuristic weight and the second heuristic weight; determining that a first combination of the first graphical element with the first heuristic weight and the second graphical element with the second heuristic weight is not within the threshold height heuristic; and dynamically rearranging the interactive graph based on an updated first location of the first graphical element and a new second location of the second graphical element.

Aspect 35. The computer-implemented method of Aspect 34, wherein the dynamic rearranging comprises: dynamically rerendering the first graphical element in the first section in an updated first location and updating the first heuristic weight based on the updated first location; dynamically rendering the second graphical element in the new second location of a second section of the two or more sections, the second section being different from the first section, and updating the second heuristic weight based on the new second location; and determining that a second combination of the first graphical element with the updated first heuristic weight and the second graphical element with the updated second heuristic weight is within the threshold height heuristic.

What is claimed is:

1. A computer-implemented method of dynamic interactive graphing, the computer-implemented method comprising:
receiving data input into a structured interface of at least one computing system, the data defining attributes of an entity, and the structured interface defining relationships between the attributes, the relationships including at least a first type of relationship and a second type of relationship;
generating, by the at least one computing system, an interactive graph of the attributes, the generating comprising arranging the attributes within the interactive graph according to the relationships, wherein the interactive graph includes a box that includes a first subset of the attributes that are related to one another according to the first type of relationship that is indicated by the box, wherein the interactive graph includes a link line between a second subset of the attributes that are related to one another according to the second type of relationship that is indicated by the link line;

causing, by the at least one computing system, the interactive graph to display in a graphical user interface;

receiving, by the at least one computing system, a selection of at least one specified attribute of the attributes; and in response to receiving the selection of the at least one specified attribute, dynamically modifying, by the at least one computing system, the interactive graph in the graphical user interface according to the at least one specified attribute, wherein dynamically modifying the interactive graph includes adding an additional element to the interactive graph and rearranging at least the link line and the box in the interactive graph to accommodate the additional element being added to the interactive graph, wherein the additional element is associated with at least one specified attribute.

2. The computer-implemented method of claim 1, wherein the attributes include different parts of the entity, and wherein generating the interactive graph includes arranging the different parts within the interactive graph based on relative weight of the different parts according to respective heuristics corresponding to the different parts.

3. The computer-implemented method of claim 1, wherein the attributes include different regions in which the entity operates, and wherein generating the interactive graph includes arranging the different regions within the interactive graph based on relative weight of the different regions according to respective heuristics corresponding to the different regions.

4. The computer-implemented method of claim 1, wherein the attributes include different competitors of the entity, and wherein generating the interactive graph includes arranging the different competitors within the interactive graph based on relative weight of the different competitors according to respective heuristics corresponding to the different competitors.

5. The computer-implemented method of claim 1, wherein the attributes include different suppliers to the entity, and wherein generating the interactive graph includes arranging the different suppliers within the interactive graph based on relative weight of the different suppliers according to respective heuristics corresponding to the different suppliers.

6. The computer-implemented method of claim 1, wherein the attributes include different groups of customers of the entity, and wherein generating the interactive graph includes arranging the different groups of customers within the interactive graph based on relative weight of the different groups of customers according to respective heuristics corresponding to the different groups of customers.

7. The computer-implemented method of claim 1, wherein generating the interactive graph includes arranging the attributes within the interactive graph according to different weights based on respective heuristics corresponding to the attributes, wherein a heuristic for an attribute is associated with at least one of revenue associated with the attribute, profit associated with the attribute, loss associated with the attribute, number of people associated with the attribute, size of the attribute, diversity associated with the attribute, or number of appearances of the attribute in other interactive graphs.

8. The computer-implemented method of claim 1, wherein dynamically rearranging the interactive graph in the graphical user interface according to the at least one specified attribute includes:

determining sub-attributes of the at least one specified attribute, wherein the interactive graph of the attributes is missing the sub-attributes prior to rearranging the interactive graph, and dynamically modifying the interactive graph in the graphical user interface to include the sub-attributes in relation to the at least one specified attribute.

9. The computer-implemented method of claim 1, wherein the attributes are categorized into attribute types, and wherein dynamically rearranging the interactive graph in the graphical user interface includes providing additional information about a specified attribute type of the attribute types, wherein the at least one specified attribute is categorized into the specified attribute type.

10. The computer-implemented method of claim 1, wherein the attributes are categorized into attribute types, and wherein dynamically rearranging the interactive graph in the graphical user interface includes removing information about a second attribute in the interactive graph based on the second attribute being categorized into a different attribute type from the at least one specified attribute.

11. The computer-implemented method of claim 1, further comprising:

receiving update data to update the at least one specified attribute, wherein dynamically rearranging the interactive graph in the graphical user interface includes updating the interactive graph and one or more additional interactive graphs using the update data, wherein the at least one specified attribute appears in the one or more additional interactive graphs.

12. The computer-implemented method of claim 1, further comprising:

receiving a search query, wherein the search query is associated with one or more of the attributes, and wherein generating the interactive graph of the attributes is based in part on the search query.

13. The computer-implemented method of claim 1, further comprising:

identifying a conflict between two or more of the attributes that are defined based on the data and previously-determined attributes; and selecting one or more output attributes based on the two or more of the attributes and the previously-determined attributes to resolve the conflict, wherein the selecting is based on input of the two or more of the attributes and the previously-determined attributes into a trained machine learning model.

14. A system for dynamic interactive graphing, the system comprising:

one or more processors; and memory storing executable instructions that, as a result of execution by the one or more processors, cause the system to:

receive data input into a structured interface of the system, the data defining attributes of an entity, and the structured interface defining relationships between the attributes, the relationships including at least a first type of relationship and a second type of relationship;

generate an interactive graph of the attributes, wherein to generate the interactive graph, the executable instructions, as a result of execution by the one or more processors, further cause the system to arrange the attributes within the interactive graph according to the relationships, wherein the interactive graph includes a box that includes a first subset of the attributes that are related to one another according to the first type of relationship that is indicated by the box, wherein the interactive graph includes a link line between a second subset of the attributes that are related to one another according to the second type of relationship that is indicated by the link line;

cause the interactive graph to display in a graphical user interface of the system;

receive a selection, made via the graphical user interface, of at least one specified attribute of the attributes in the interactive graph; and of in response to receiving the selection of the at least one specified attribute, dynamically modify the interactive graph in the graphical user interface according to the at least one specified attribute, wherein dynamically modifying the interactive graph includes adding an additional element to the interactive graph and rearranging at least the link line and the box in the interactive graph to accommodate the additional element being added to the interactive graph, wherein the additional element is associated with at least one specified attribute.

15. The system of claim 14, wherein execution of the executable instructions by the one or more processors further causes the system to:

store, in a database of the system, the attributes according to a plurality of categories, wherein the plurality of categories includes different parts of the entity, different regions in which the entity operates, different competitors of the entity, different suppliers to the entity, and different groups of customers of the entity;

store, in the database of the system, the relationships between the attributes based in part on the plurality of categories; and dynamically update the database according to the data input into the structured interface.

16. The system of claim 14, wherein, to generate the interactive graph, execution of the executable instructions by the one or more processors further causes the system to:

arrange the attributes within the interactive graph based in part, for each attribute, on a respective category of a plurality of categories of the attributes, a relative weight within the respective category, and an assigned significance factor with respect to a role of each attribute within the interactive graph.

17. The system of claim 14, wherein, to generate the interactive graph, execution of the executable instructions by the one or more processors further causes the system to:

arrange the attributes within the interactive graph according to different weights based on respective heuristics corresponding to the attributes, wherein a heuristic for an attribute is associated with at least one of revenue associated with the attribute, profit associated with the attribute, loss associated with the attribute, number of people associated with the attribute, size of the attribute, diversity associated with the attribute, or number of appearances of the attribute in other interactive graphs.

18. The system of claim 14, wherein the attributes are categorized into attribute types, and wherein, to dynamically rearrange the interactive graph in the graphical user interface, execution of the executable instructions by the one or more processors further causes the system to:

remove information about a second attribute in the interactive graph based on the second attribute being categorized into a different attribute type from the at least one specified attribute.

19. The system of claim 14, wherein execution of the executable instructions by the one or more processors further causes the system to:

receive update data to update the at least one specified attribute; and update the interactive graph and one or more additional interactive graphs using the update data, wherein the at least one specified attribute appears in the one or more additional interactive graphs.

20. A computer-implemented method for dynamically rearranging an interactive graph in a structured interface, the computer-implemented method comprising:

determining, by at least one computing system, a first location of a first graphical element of the interactive graph in the structured interface, wherein the first graphical element is rendered in a first section of the interactive graph in the structured interface, and wherein the interactive graph is organized in two or more sections;

receiving, by the at least one computing system, data for a second graphical element to be rendered in the interactive graph in the structured interface with a graphical indicator of a relationship between the first graphical element and the second graphical element;

computing, by the at least one computing system, a first heuristic weight of the first graphical element based on the first location of the first graphical element and a second heuristic weight of the second graphical element based on a second location of the second graphical element;

computing, by the at least one computing system, a threshold heuristic of the first section of the two or more sections based on the first heuristic weight and the second heuristic weight;

determining, by the at least one computing system, that a first combination of the first graphical element with the first heuristic weight and the second graphical element with the second heuristic weight is not within the threshold heuristic; and dynamically modifying, by the at least one computing system, the interactive graph based on an updated first location of the first graphical element and an updated second location of the second graphical element, wherein the dynamic modifying comprises:

dynamically rerendering the first graphical element in the first section in the updated first location;

updating the first heuristic weight based on the updated first location;

dynamically rendering the second graphical element in the updated second location of a second section of the two or more sections, the second section being different from the first section;

updating the second heuristic weight based on the updated second location;

determining that a second combination of the first graphical element with the updated first heuristic weight and the second graphical element with the updated second heuristic weight is within the threshold heuristic; and adjusting the graphical indicator of the relationship between first graphical element and the second graphical element to accommodate the updated first location of the first graphical element and the updated second location of the second graphical element.

* * * * *